United States Patent
Hoover et al.

(10) Patent No.: US 12,552,539 B2
(45) Date of Patent: Feb. 17, 2026

(54) METHOD FOR AUTOMATIC SEAT PAN TILT

(71) Applicant: AMI Industries, Inc., Colorado Springs, CO (US)

(72) Inventors: Douglas E. Hoover, Colorado Springs, CO (US); Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 181 days.

(21) Appl. No.: 18/509,857

(22) Filed: Nov. 15, 2023

(65) Prior Publication Data

US 2025/0153851 A1    May 15, 2025

(51) Int. Cl.
*B64D 11/06* (2006.01)
*B64D 25/04* (2006.01)

(52) U.S. Cl.
CPC ........ *B64D 11/064* (2014.12); *B64D 11/0648* (2014.12); *B64D 11/0689* (2013.01); *B64D 25/04* (2013.01)

(58) Field of Classification Search
CPC .............. B64D 11/064; B64D 11/0689; B64D 11/0648; B64D 25/04
See application file for complete search history.

(56) References Cited

U.S. PATENT DOCUMENTS

| | | | |
|---|---|---|---|
| 6,073,884 A | 6/2000 | Lavergne | |
| 8,408,643 B2 | 4/2013 | Honnorat | |
| 8,636,121 B2 | 1/2014 | Manfredotti et al. | |
| 9,290,272 B1 | 3/2016 | Hoover et al. | |
| 9,382,008 B2 | 7/2016 | Fornecker | |
| 9,421,886 B2 | 8/2016 | Cecinas et al. | |
| 9,585,480 B2 | 3/2017 | Ferguson et al. | |
| 9,725,176 B2 | 8/2017 | Ferguson et al. | |
| 9,908,441 B2 | 3/2018 | Ferguson et al. | |
| 9,981,574 B2 | 5/2018 | Olivares | |
| 11,577,839 B2 | 2/2023 | Hoover | |
| 2009/0045659 A1 | 2/2009 | List et al. | |
| 2009/0267390 A1 | 10/2009 | Honnorat et al. | |
| 2018/0222591 A1 | 8/2018 | Pacheco et al. | |
| 2022/0042589 A1 | 2/2022 | Hoover et al. | |
| 2023/0144561 A1 | 5/2023 | Pacheco et al. | |

FOREIGN PATENT DOCUMENTS

| | | |
|---|---|---|
| CA | 2638210 C | 3/2013 |
| CN | 112141344 A | 12/2020 |
| EP | 2113457 B1 | 6/2014 |
| EP | 4177163 A1 | 5/2023 |
| GB | 2222937 A | 3/1990 |

OTHER PUBLICATIONS

European Patent Office, Extended European Search Report received in EP Application No. 24213397.3, Mar. 18, 2025, 9 pages.

*Primary Examiner* — Anthony D Barfield
(74) *Attorney, Agent, or Firm* — Suiter Swantz IP

(57) ABSTRACT

A seat assembly includes a seat pan that is tilted automatically by way of a seat bucket moving up and down relative to a base structure. The seat bucket is pivotably coupled to a carrier. The carrier and the seat bucket each follow respective channels of a base structure. The movement of the seat bucket along the channel of the base structure causes the pivoting of the seat bucket relative to the carrier. The channels are shaped with an angular orientation resulting in the seat pan angle changing as the seat bucket moves up and down.

14 Claims, 24 Drawing Sheets

METHOD FOR AUTOMATIC SEAT PAN TILT

TECHNICAL FIELD

The present invention generally relates to seats, and more specifically to seats with energy absorbing means adapted for mitigating impact loads.

BACKGROUND

Helicopter pilot seats have an adjustable seat pan tilting feature. The seat pan tilting feature offers support for the pilot's thighs for improved comfort. The seat pan tilting feature also positions the pilot's upper legs to promote the correct line of action to the foot controls on the cockpit floor. Complicated linkage mechanisms cause a tilting action to provide the seat pan tilting feature. The linkage mechanisms are costly and heavy solutions that may be prone to reliability issues. Therefore, it would be advantageous to provide a device, system, and method that cures the shortcomings described above.

SUMMARY

A seating assembly is described. The seating assembly comprises a base structure. The base structure comprises a pair of side panels. The pair of side panels each define a carrier channel and a bucket channel. The bucket channel comprises an upper portion, a lower portion, and an inlet portion. A distance between the upper portion and the carrier channel increases from the inlet portion to the lower portion. The lower portion is disposed below and extends from the upper portion. The inlet portion is disposed above and extends from the upper portion. The seating assembly comprises a carrier. The carrier comprises one or more carrier bearings. The one or more carrier bearings are disposed in and follow the carrier channel. The seating assembly comprises a seat bucket. The seat bucket comprises one or more seat bucket bearings. The one or more seat bucket bearings are disposed in and follow the bucket channel. The seat bucket is coupled to the carrier by a revolute joint. The upper portion is shaped relative to the carrier channel to cause rotation of the seat bucket about the revolute joint when the seat bucket follows the upper portion.

In some embodiments, the upper portion is rectilinear.

In some embodiments, the upper portion is curvilinear.

In some embodiments, the lower portion is curvilinear. A distance between the lower portion and the carrier channel increases away from the upper portion.

In some embodiments, the carrier channel and the bucket channel are interior-facing slots defined by the pair of side panels.

In some embodiments, the revolute joint comprises an axis of rotation which is in a lateral direction.

In some embodiments, the seat bucket comprises a seat pan. The rotation of the seat bucket about the revolute joint causes rotation of the seat pan.

In some embodiments, the carrier and the seat bucket follow the carrier channel and the bucket channel upwards to simultaneously raise a height of the seat pan and decrease an angle of the seat pan. The carrier and the seat bucket follow the carrier channel and the bucket channel downwards to simultaneously lower the height of the seat pan and increase the angle of the seat pan.

In some embodiments, the angle of the seat pan changes by at least six degrees as the seat bucket follows the upper portion.

In some embodiments, the angle of the seat pan changes by at least nine degrees as the seat bucket follows the upper portion.

In some embodiments, the seating assembly comprises a metering block and an energy absorbing sheet. The metering block is coupled to the base structure by the energy absorbing sheet. The metering block defines a plurality of holes arranged in a linear array. The carrier comprises a lock assembly. The lock assembly is configured to lock and unlock the seat bucket by selectively engaging with the plurality of holes of the metering block.

In some embodiments, the plurality of holes face at least one of the pair of side panels.

In some embodiments, the base structure comprises a middle spreader. The middle spreader rigidly couples the pair of side panels. The energy absorbing sheet couples the middle spreader and the metering block.

In some embodiments, the energy absorbing sheet is in an undeformed state while the seat bucket follows the upper portion. The carrier causes the energy absorbing sheet to deform as the seat bucket follows the lower portion.

In some embodiments, the carrier defines a recess; wherein the recess receives but does not engage with the metering block when the seat bucket follows the upper portion.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
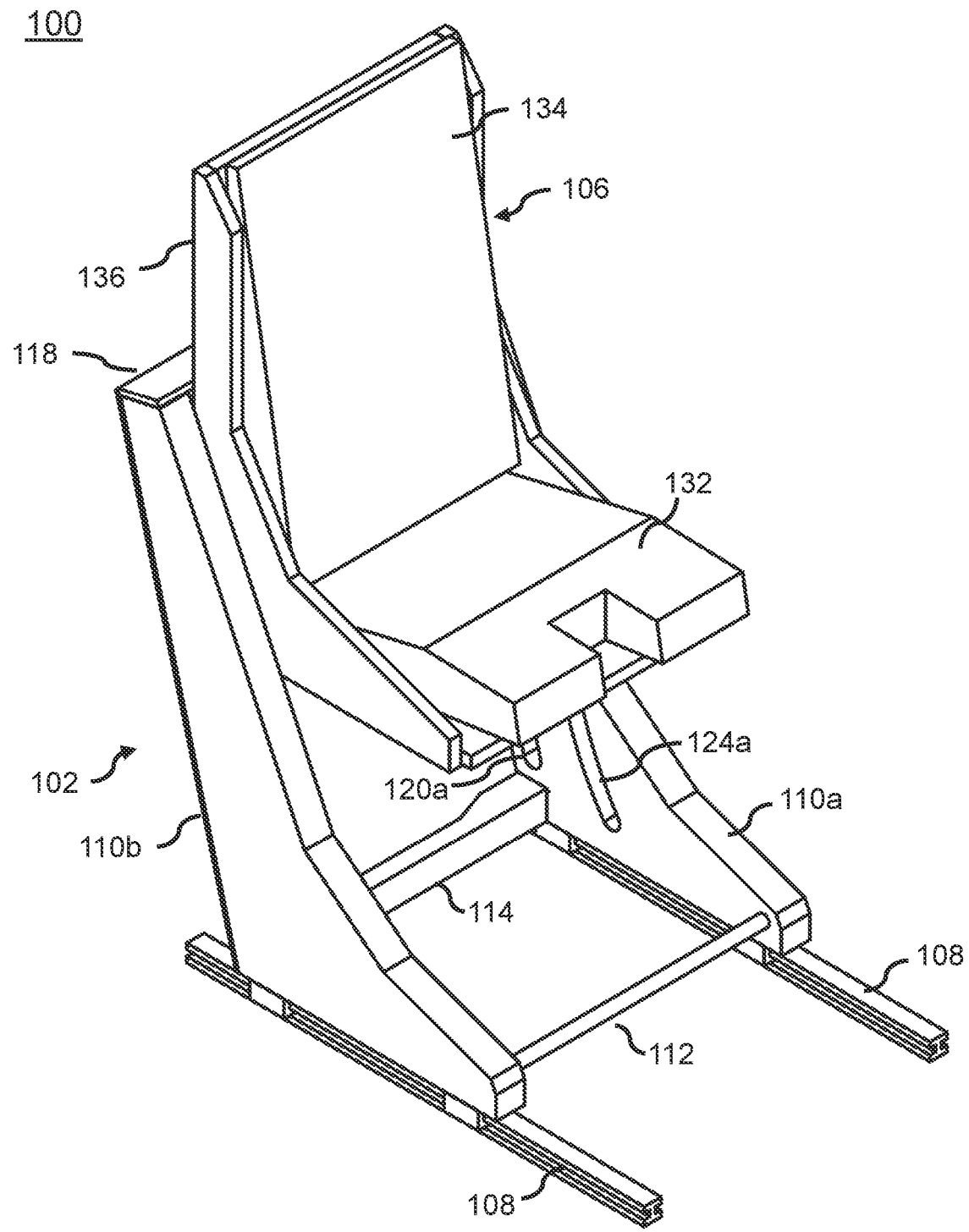
FIG. 1A depicts a front right perspective view of a seating assembly in a full up position, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a method for automatic seat pan tilt. The method for automatic seat pan tilt is implemented by a seat assembly. The seat assembly includes a seat pan that is tilted automatically by way of a seat bucket moving up and down relative to a base structure. The seat bucket is pivotably coupled to a carrier. The carrier and the seat bucket each follow respective channels of a base structure. The movement of the seat bucket along the channel of the base structure causes the pivoting of the seat bucket relative to the carrier. The channels are shaped with an angular orientation resulting in the seat pan angle changing as the seat bucket moves up and down.

The seat bucket is held in place at different vertical positions using a lock assembly that interacts with a vertical adjustment metering block. A spring-loaded pop pin is used to pierce holes in the metering block. The spring-loaded pop pin constrains the position of the seat bucket relative to the base structure. To unlock the pop pin, a control lever can be pulled, which then puts tension into a cable that is attached to the pop pin, and thereby pulls the pop pin out of the metering block hole.

U.S. Patent Publication Number US20230144561A1, titled "Compact rotorcraft seating assembly with non-linear bucket guide channels"; is incorporated herein by reference in the entirety.

Figure 1B:
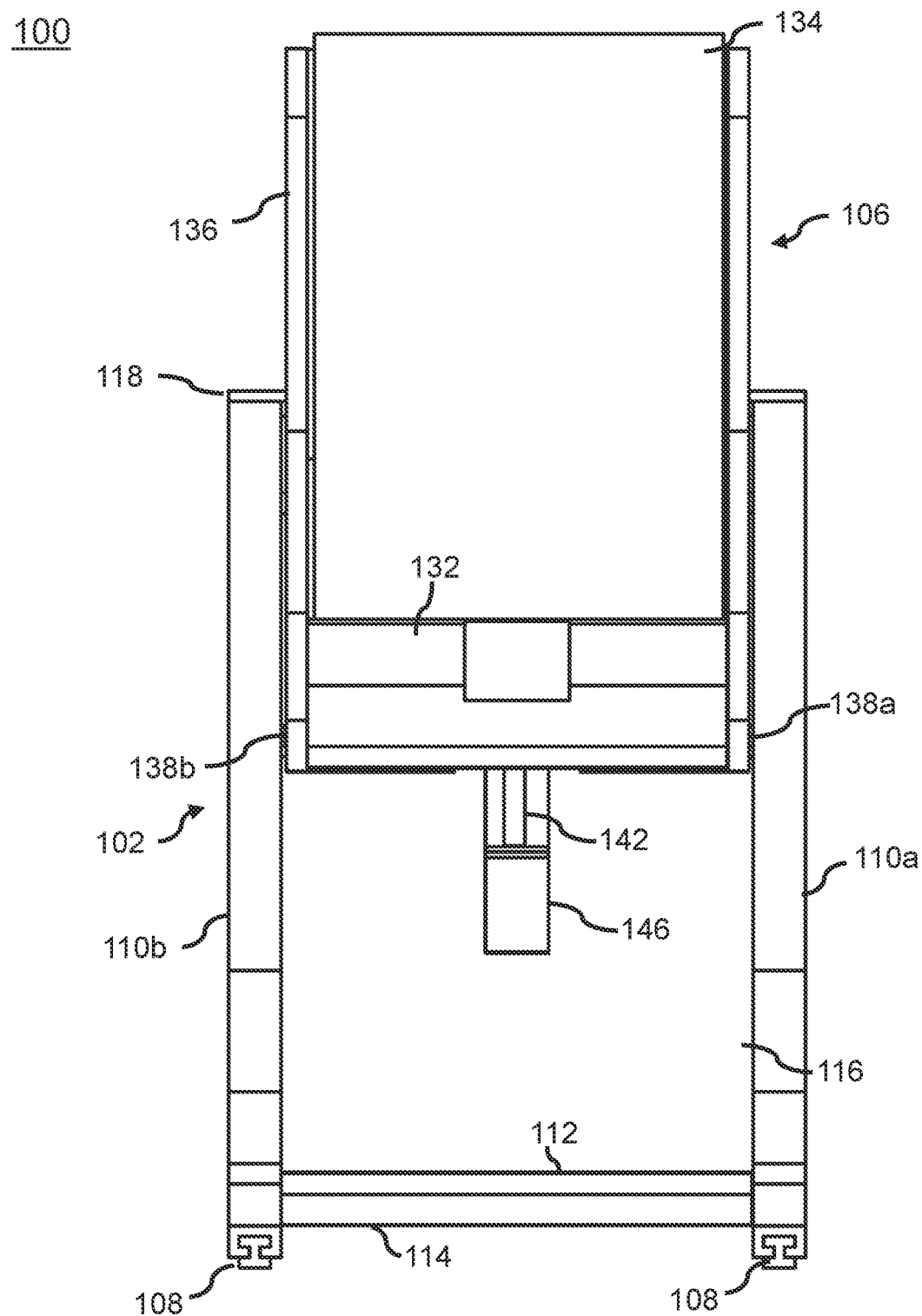
FIG. 1B depicts a front view of the seating assembly in the full up position, in accordance with one or more embodiments of the present disclosure.
Figure 1C:
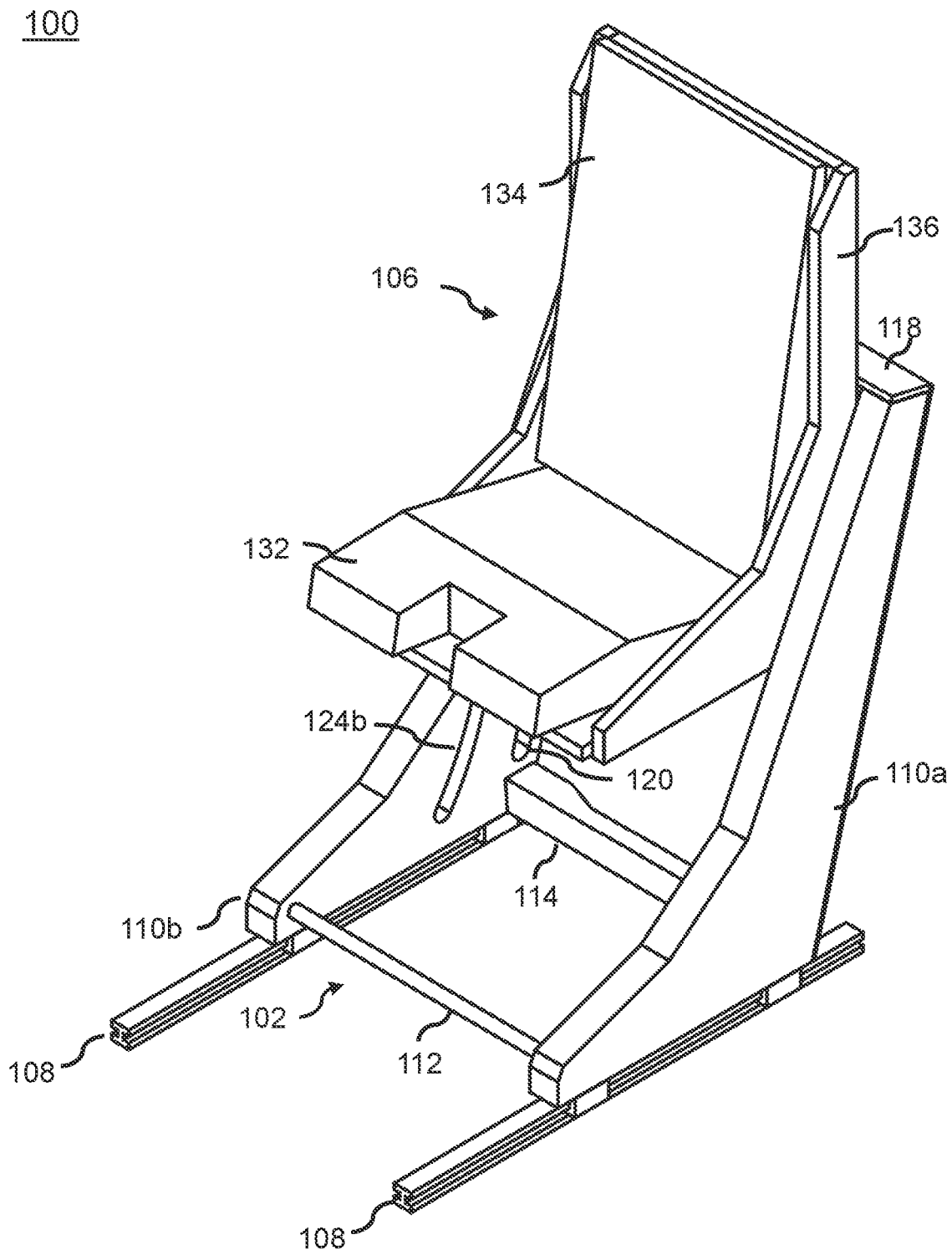
FIG. 1C depicts a front left perspective view of the seating assembly in the full up position, in accordance with one or more embodiments of the present disclosure.
Figure 1D:
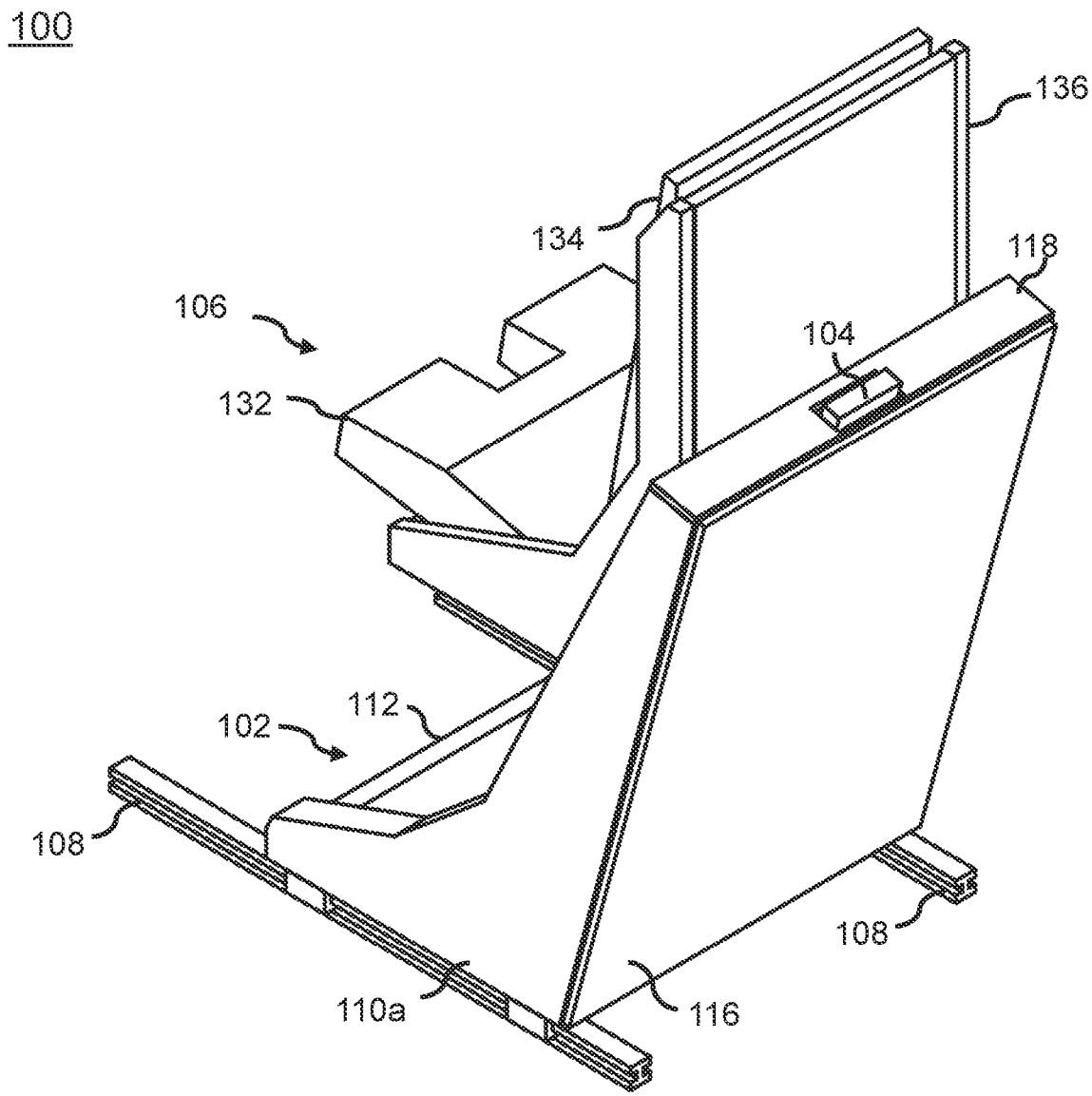
FIG. 1D depicts a rear left perspective view of the seating assembly in the full up position, in accordance with one or more embodiments of the present disclosure.
Figure 1E:
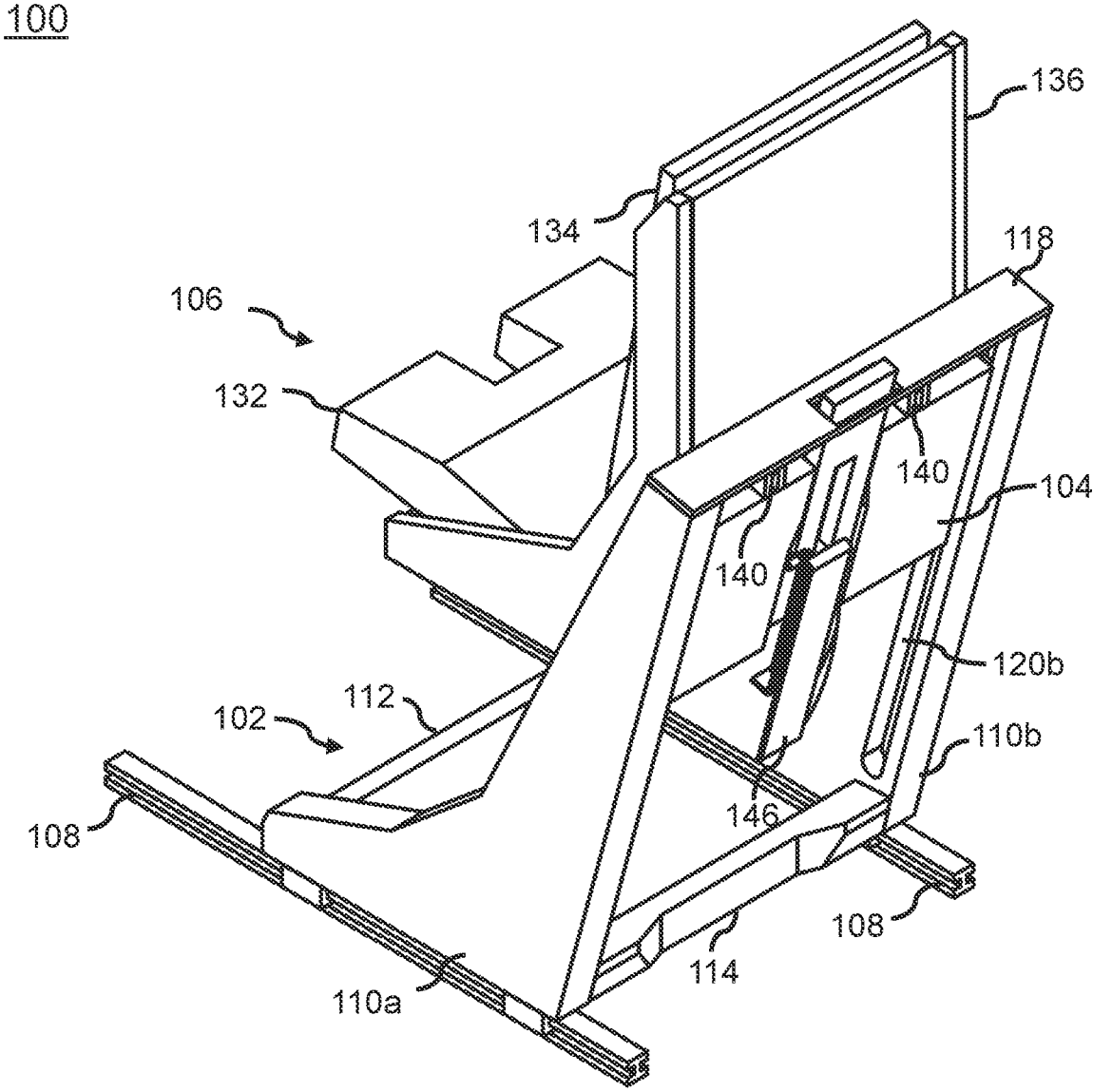
FIG. 1E depicts the rear left perspective view of FIG. 1D with a middle spreader which is hidden to illustrate components of the seating assembly more clearly, in accordance with one or more embodiments of the present disclosure.
Figure 1F:
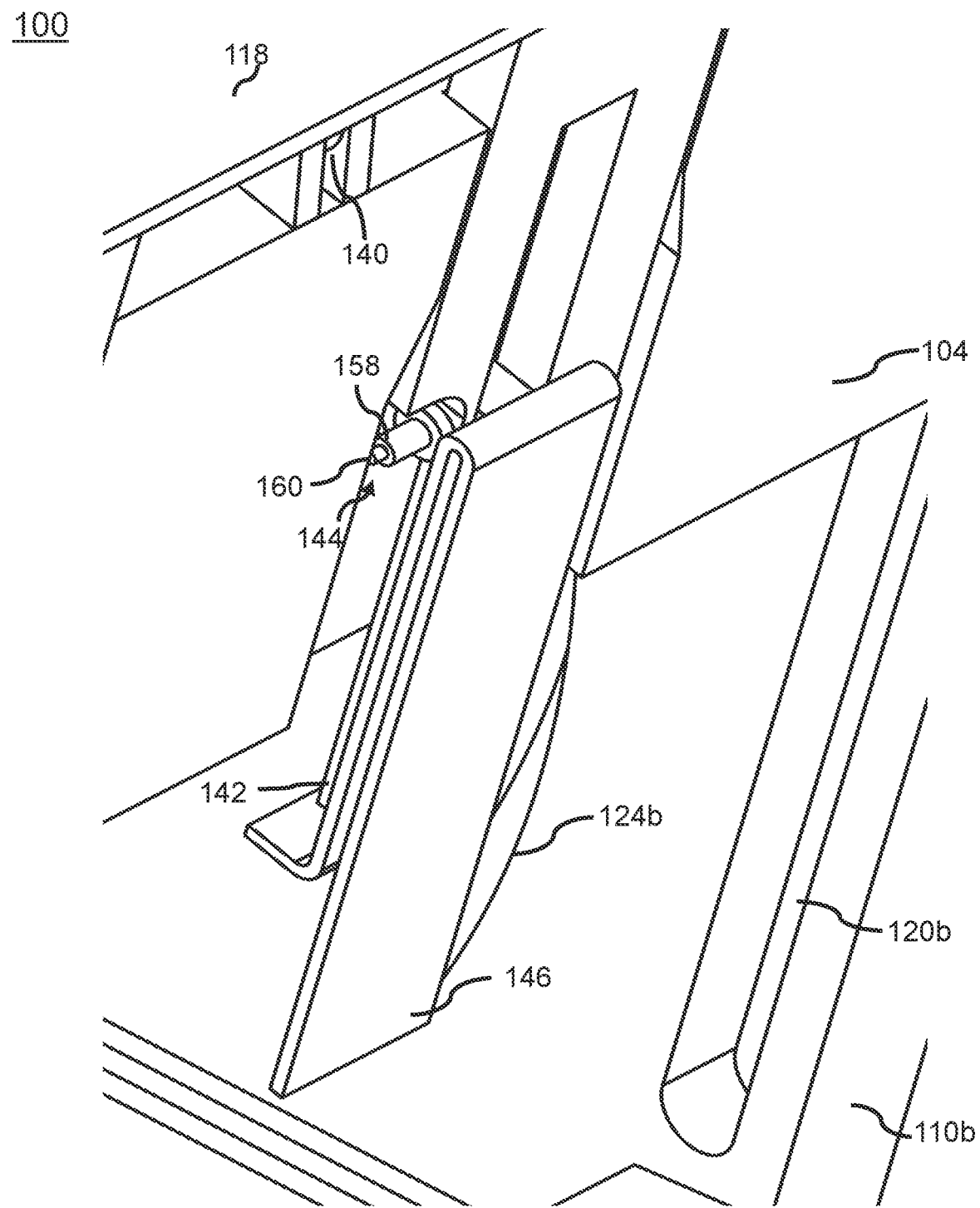
FIG. 1F depicts a partial view of the rear left perspective view of FIG. 1E, in accordance with one or more embodiments of the present disclosure.
Figure 1G:
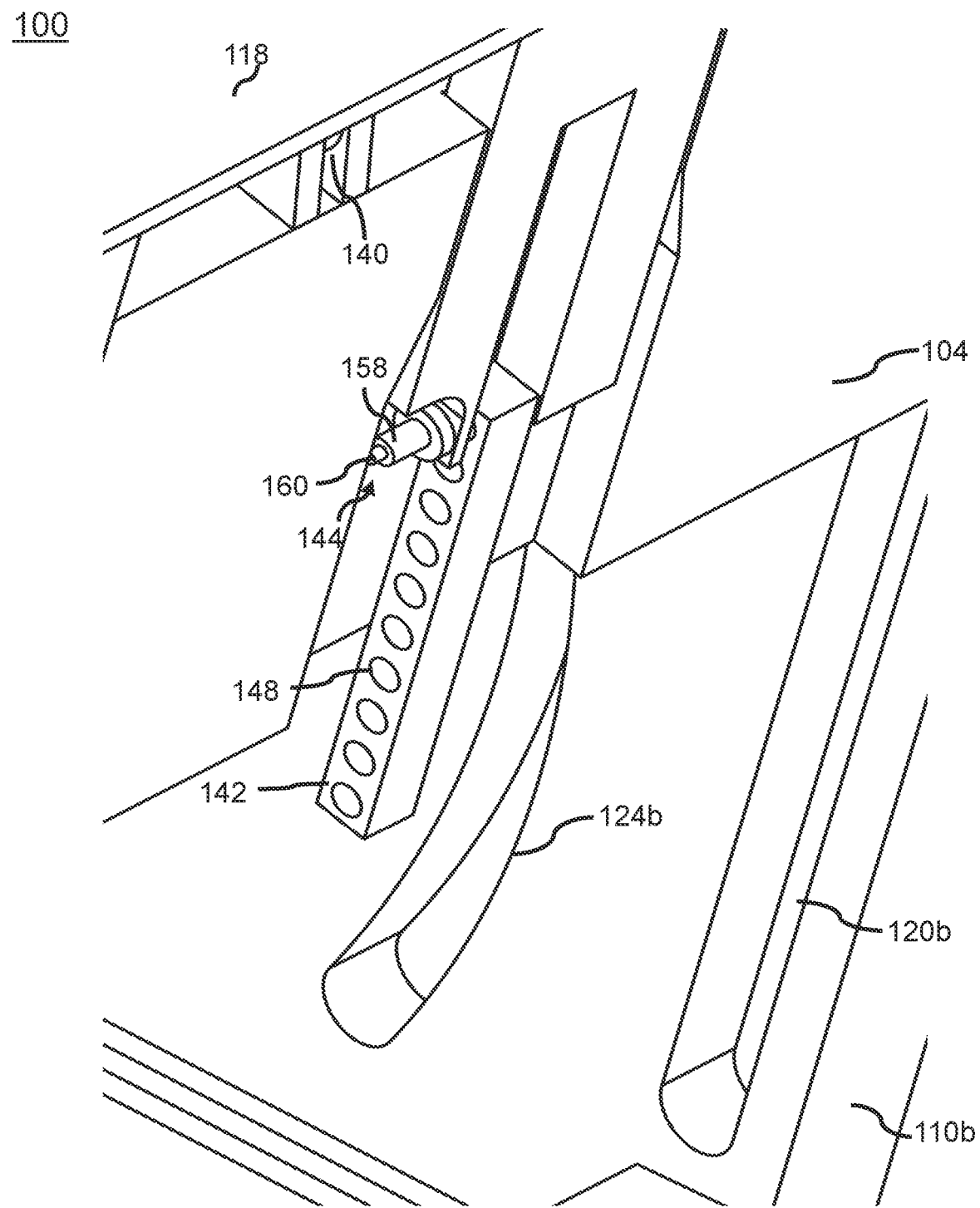
FIG. 1G depicts the view of FIG. 1F with an energy absorbing sheet which is hidden to illustrate components of the seating assembly more clearly, in accordance with one or more embodiments of the present disclosure.
Figure 1H:
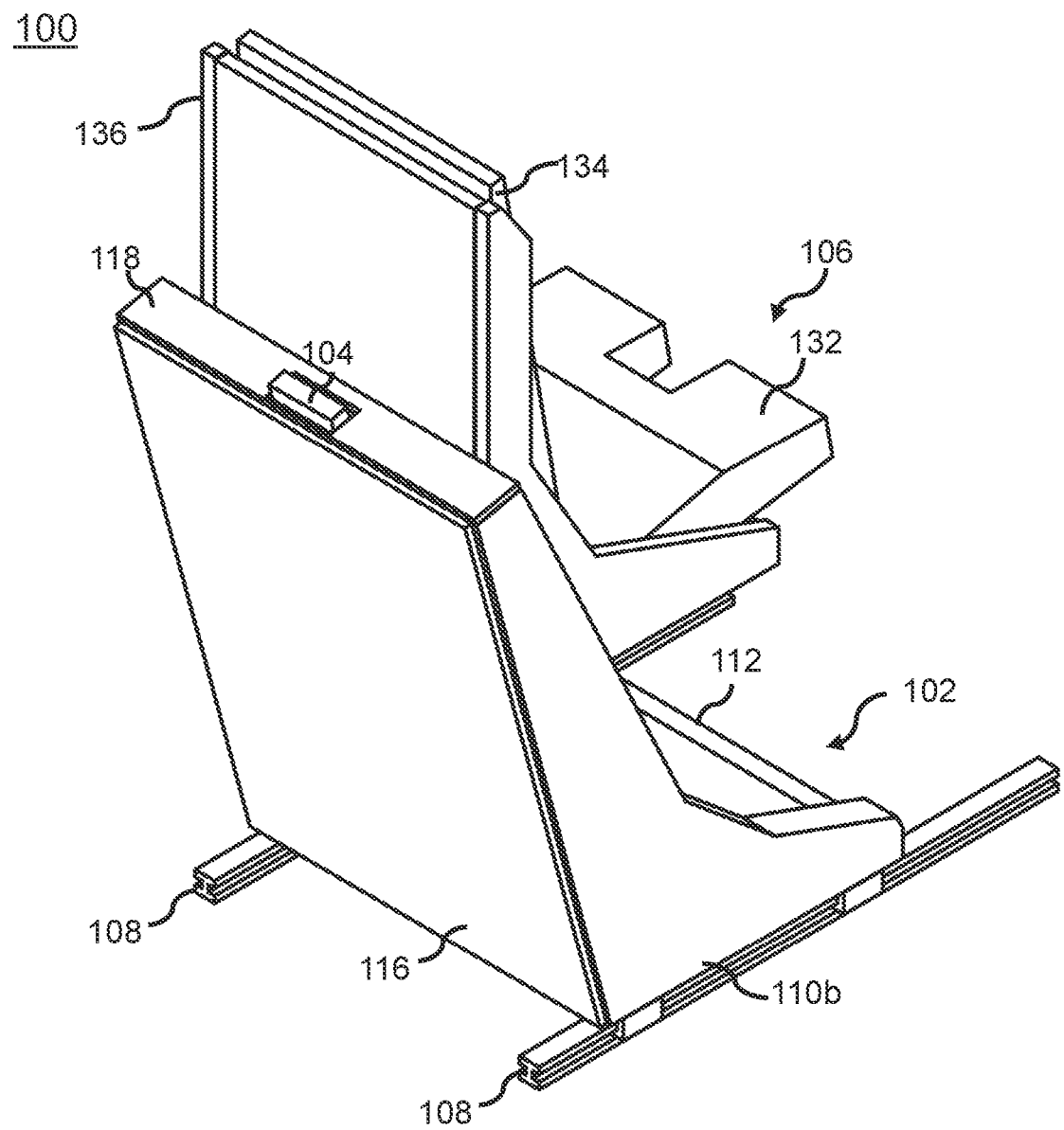
FIG. 1H depicts a rear right perspective view of the seating assembly in the full up position, in accordance with one or more embodiments of the present disclosure.
Figure 1I:
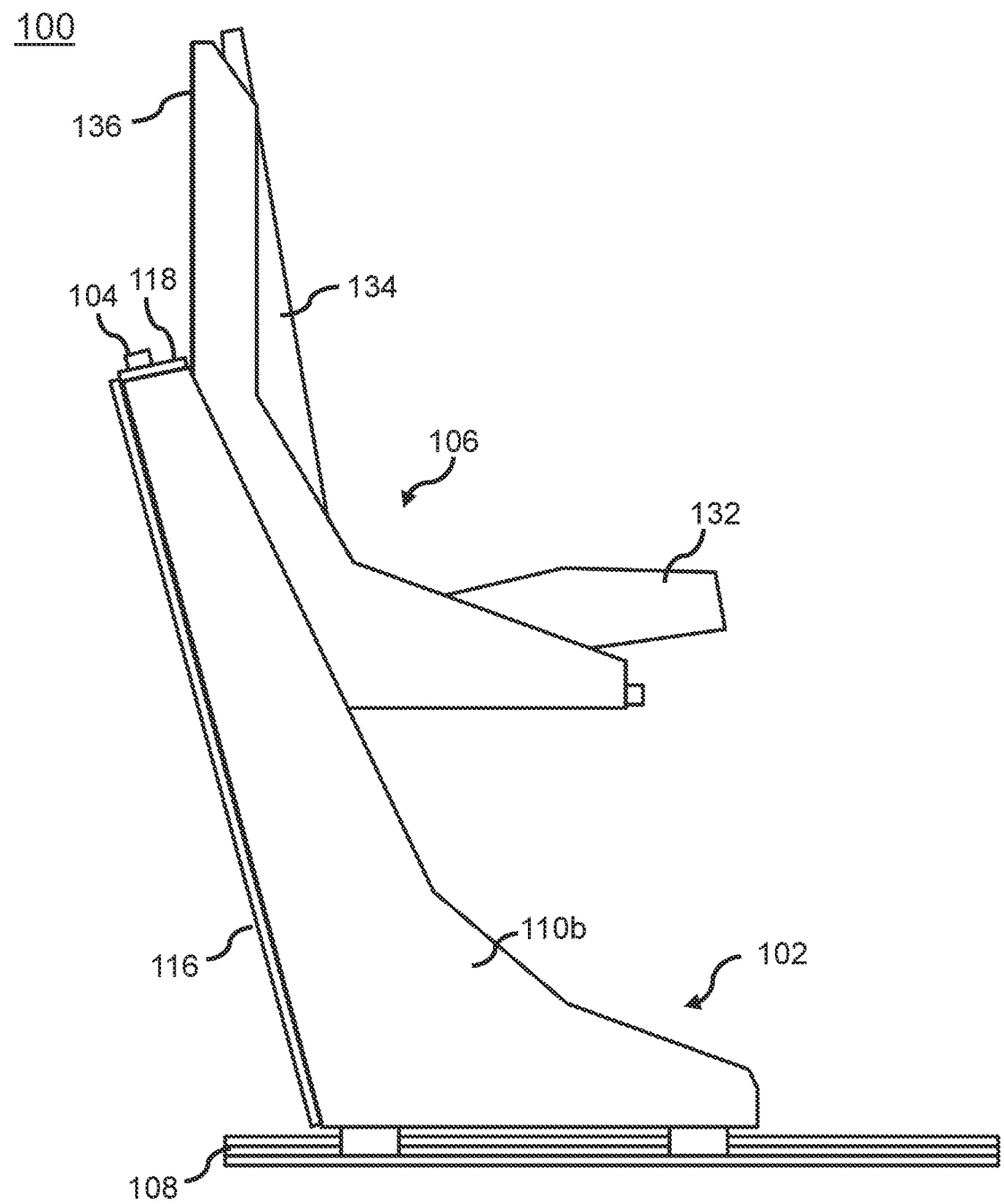
FIG. 1I depicts a right view of the seating assembly in the full up position, in accordance with one or more embodiments of the present disclosure.
Figure 1J:
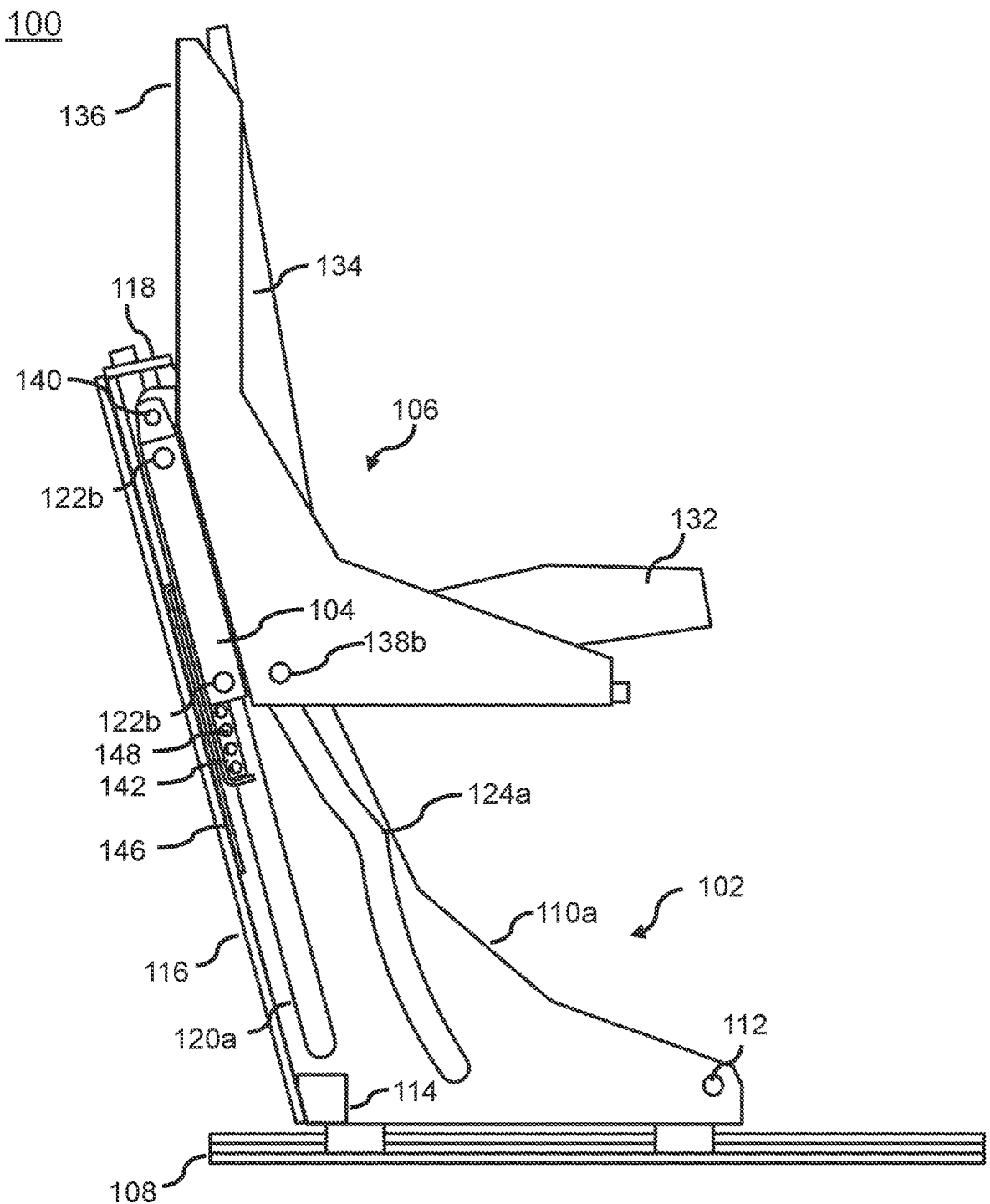
FIG. 1J depicts the right view of FIG. 1I with a right-side panel which is hidden to illustrate components of the seating assembly more clearly, in accordance with one or more embodiments of the present disclosure.
Figure 1K:
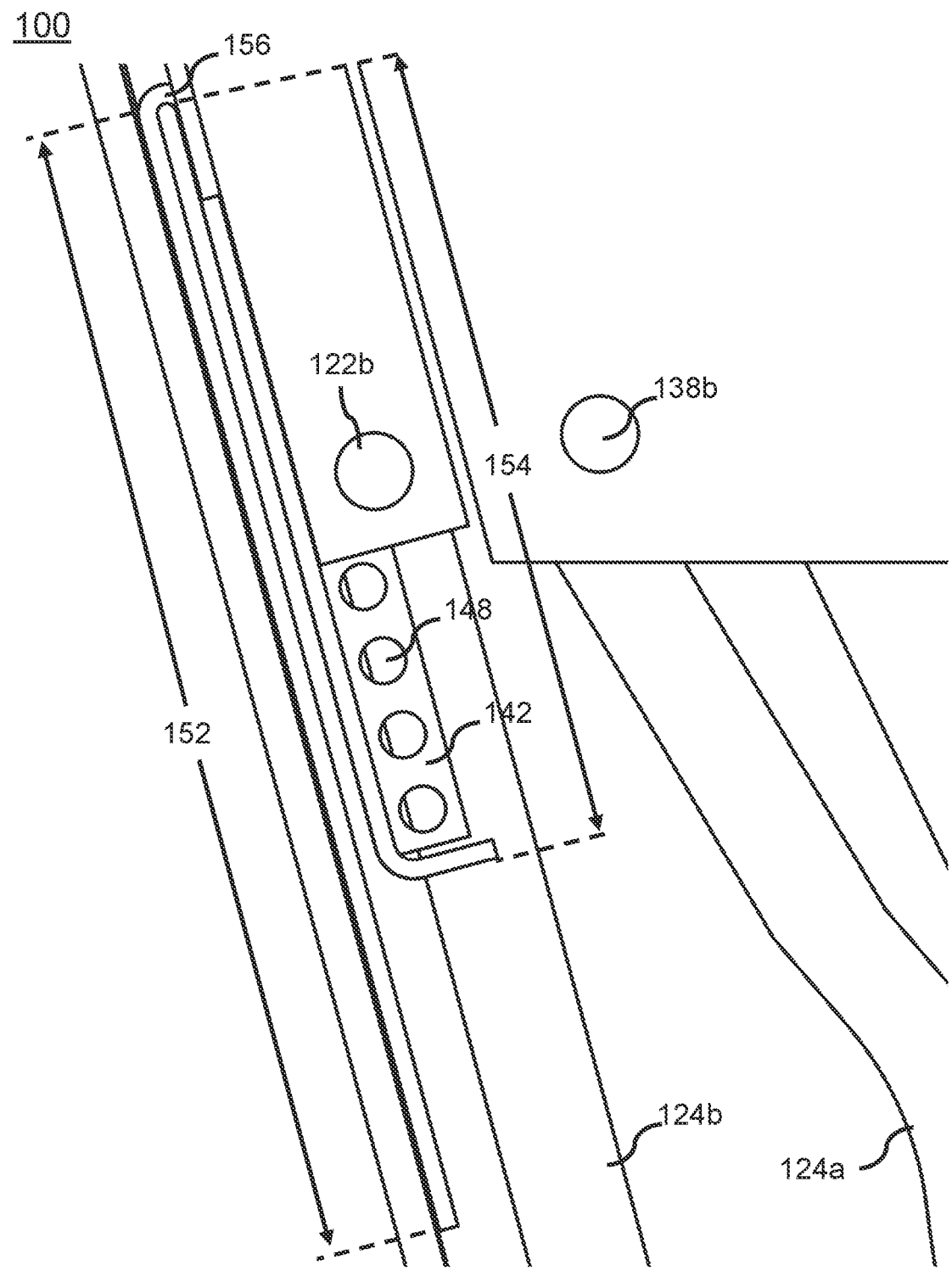
FIG. 1K depicts a partial view of the view of FIG. 1J, in accordance with one or more embodiments of the present disclosure.
Figure 2A:
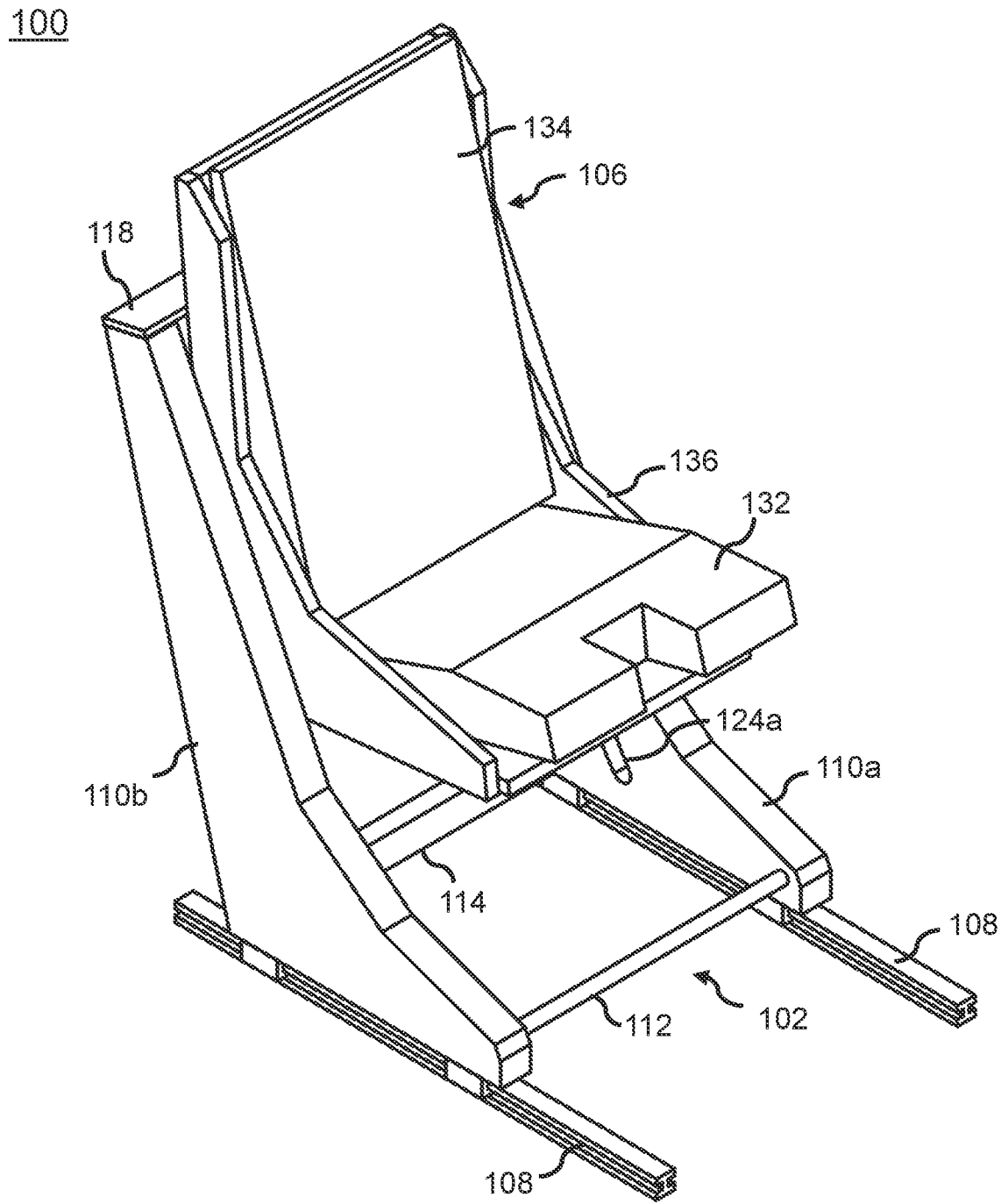
FIG. 2A depicts a front right perspective view of the seating assembly in a full-down position, in accordance with one or more embodiments of the present disclosure.
Figure 2B:
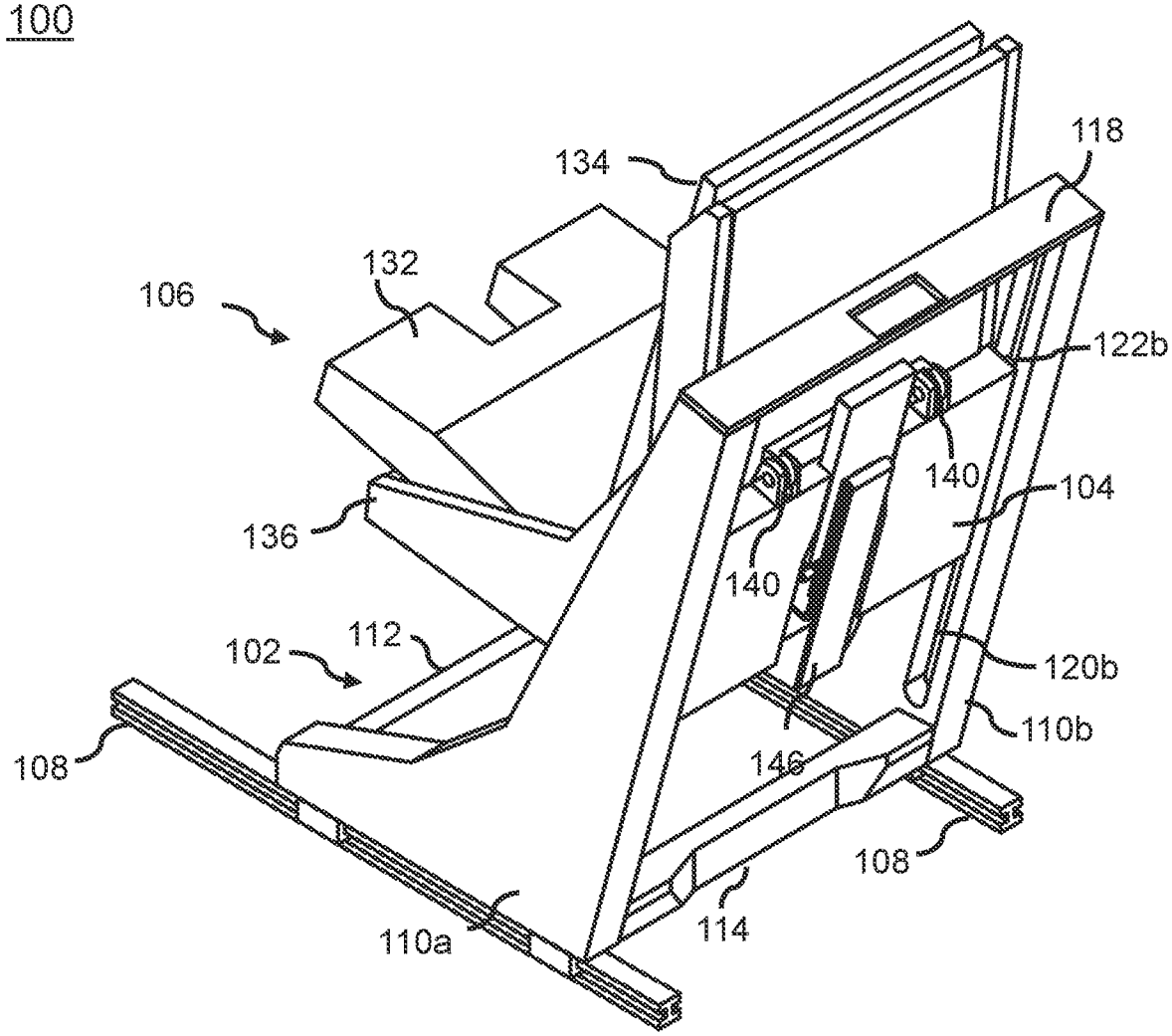
FIG. 2B depicts a rear left perspective view of the seating assembly in the full-down position with a middle spreader which is hidden to illustrate components of the seating assembly more clearly, in accordance with one or more embodiments of the present disclosure.
Figure 2C:
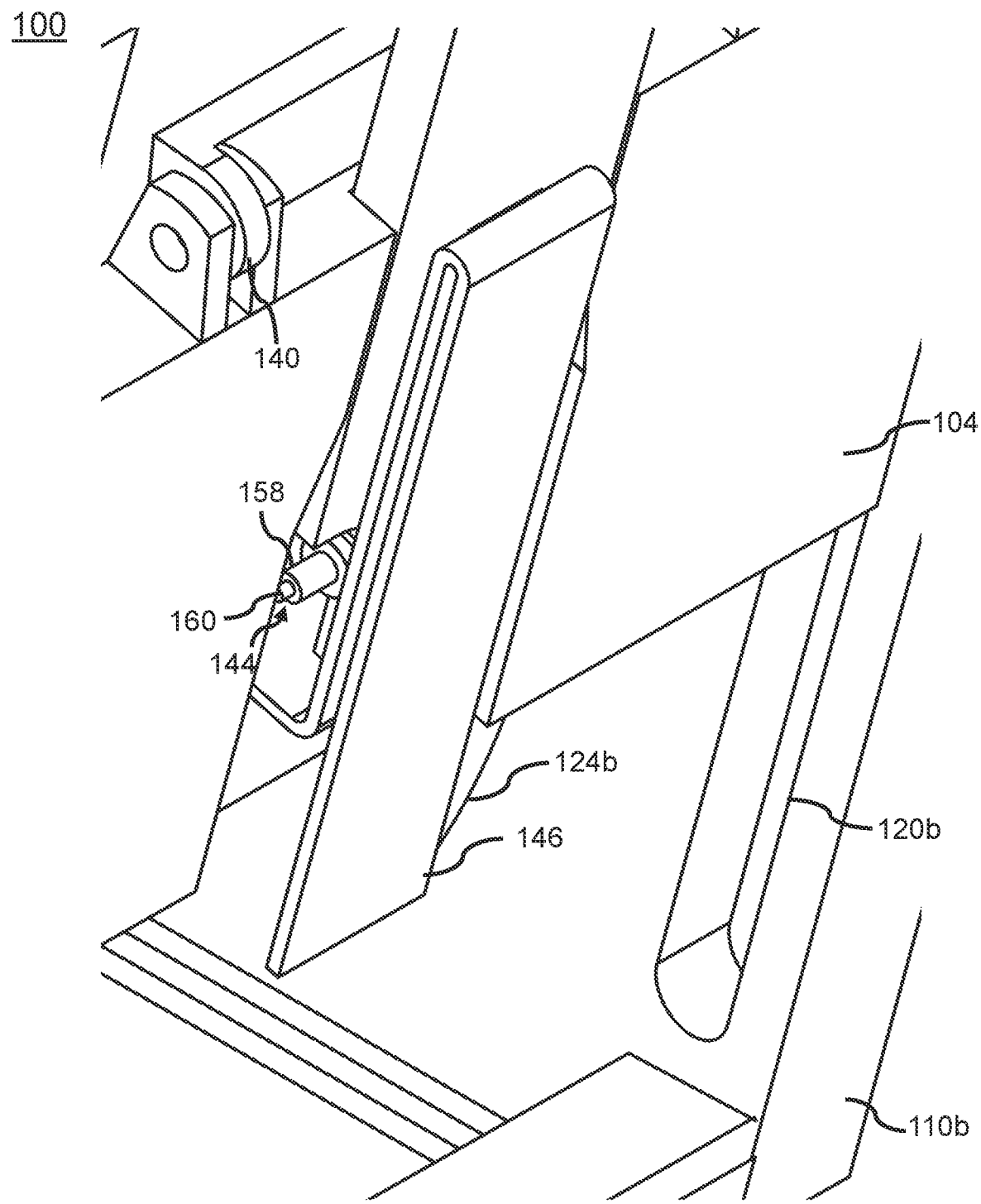
FIG. 2C depicts a partial view of the rear left perspective view of FIG. 2B, in accordance with one or more embodiments of the present disclosure.
Figure 2D:
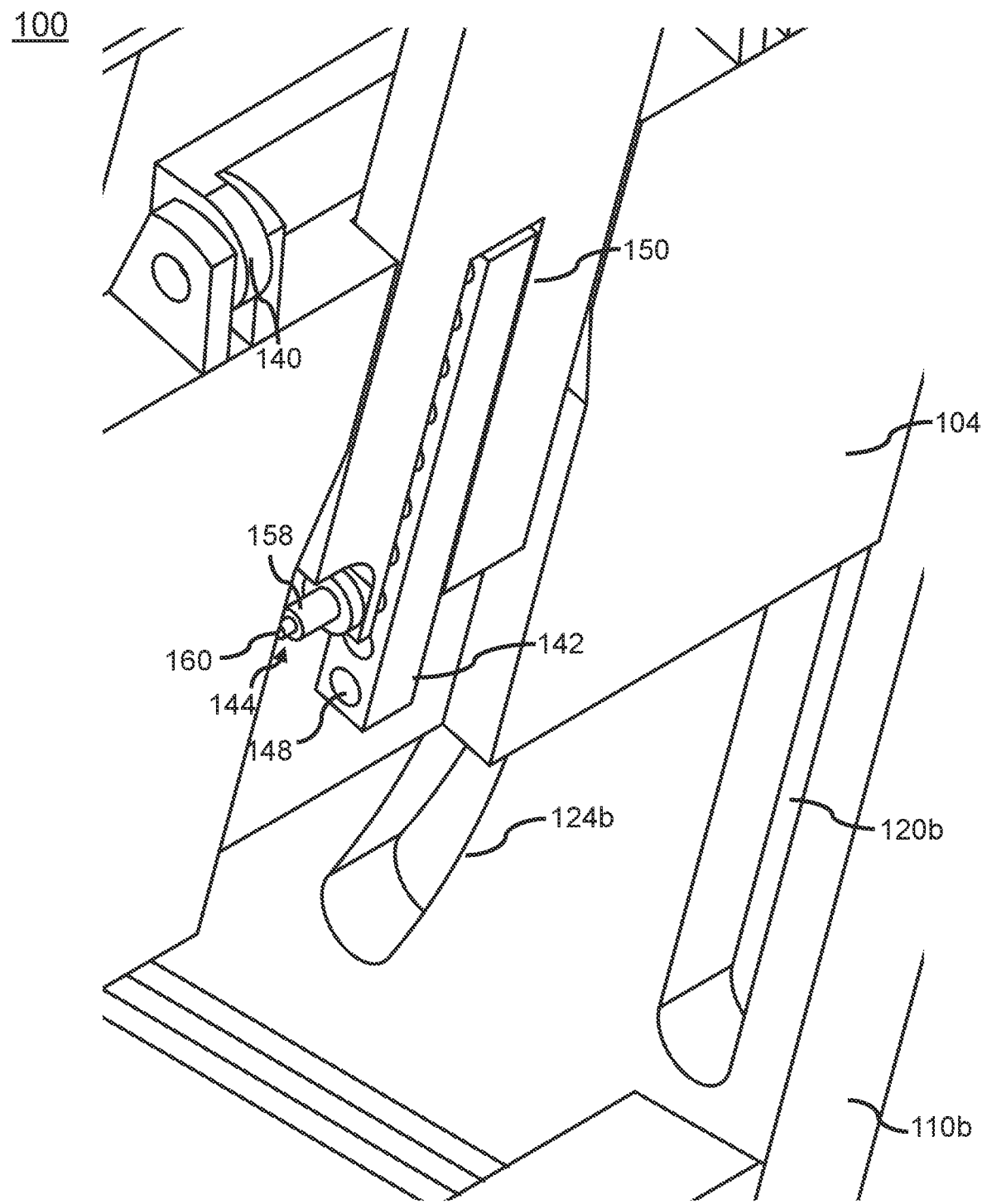
FIG. 2D depicts the view of FIG. 2C with an energy absorbing sheet which is hidden to illustrate components of the seating assembly more clearly, in accordance with one or more embodiments of the present disclosure.
Figure 2E:
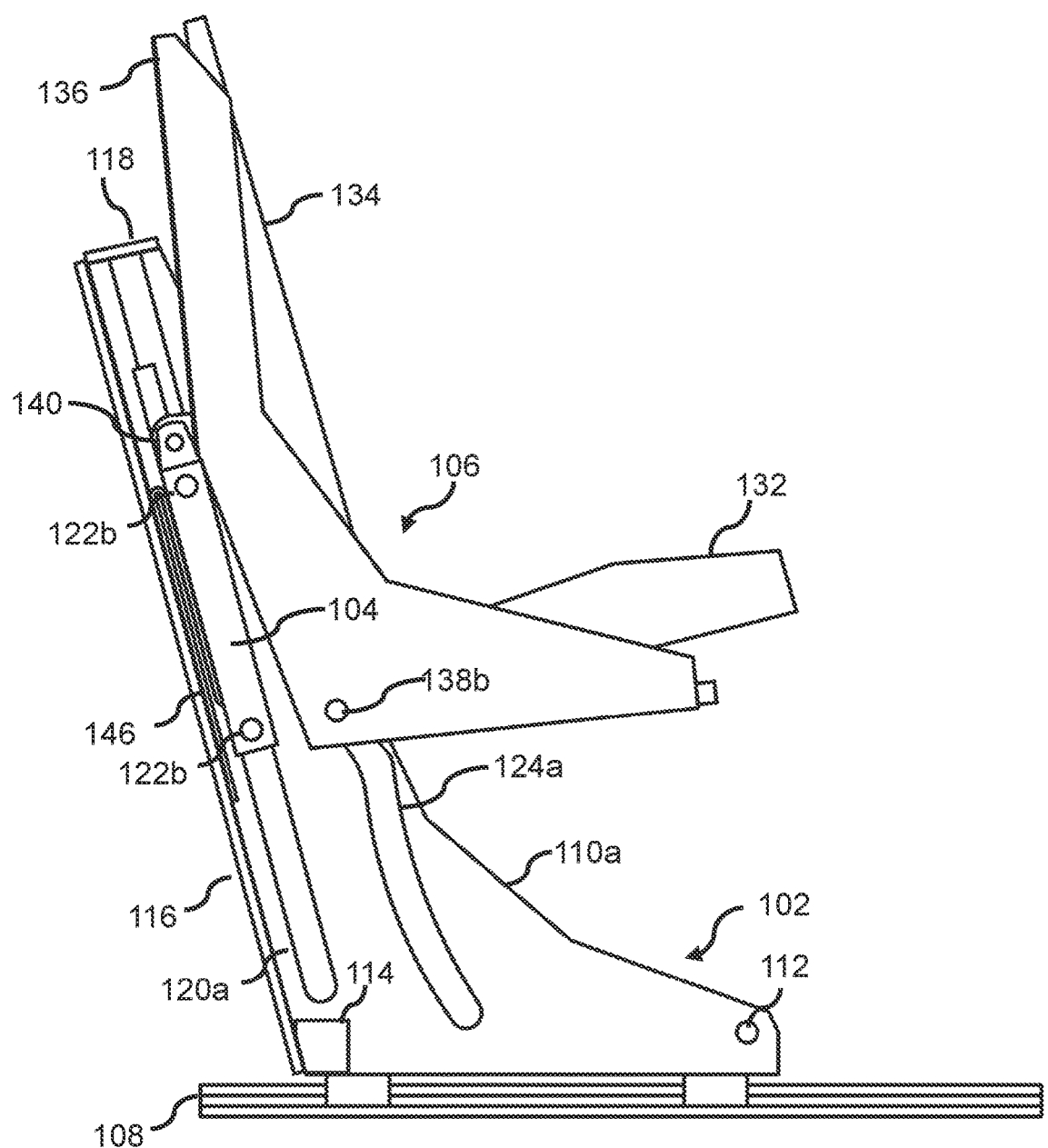
FIG. 2E depicts a right view of the seating assembly in the full-down position with a right-side panel which is hidden to illustrate components of the seating assembly more clearly, in accordance with one or more embodiments of the present disclosure.
Figure 2F:
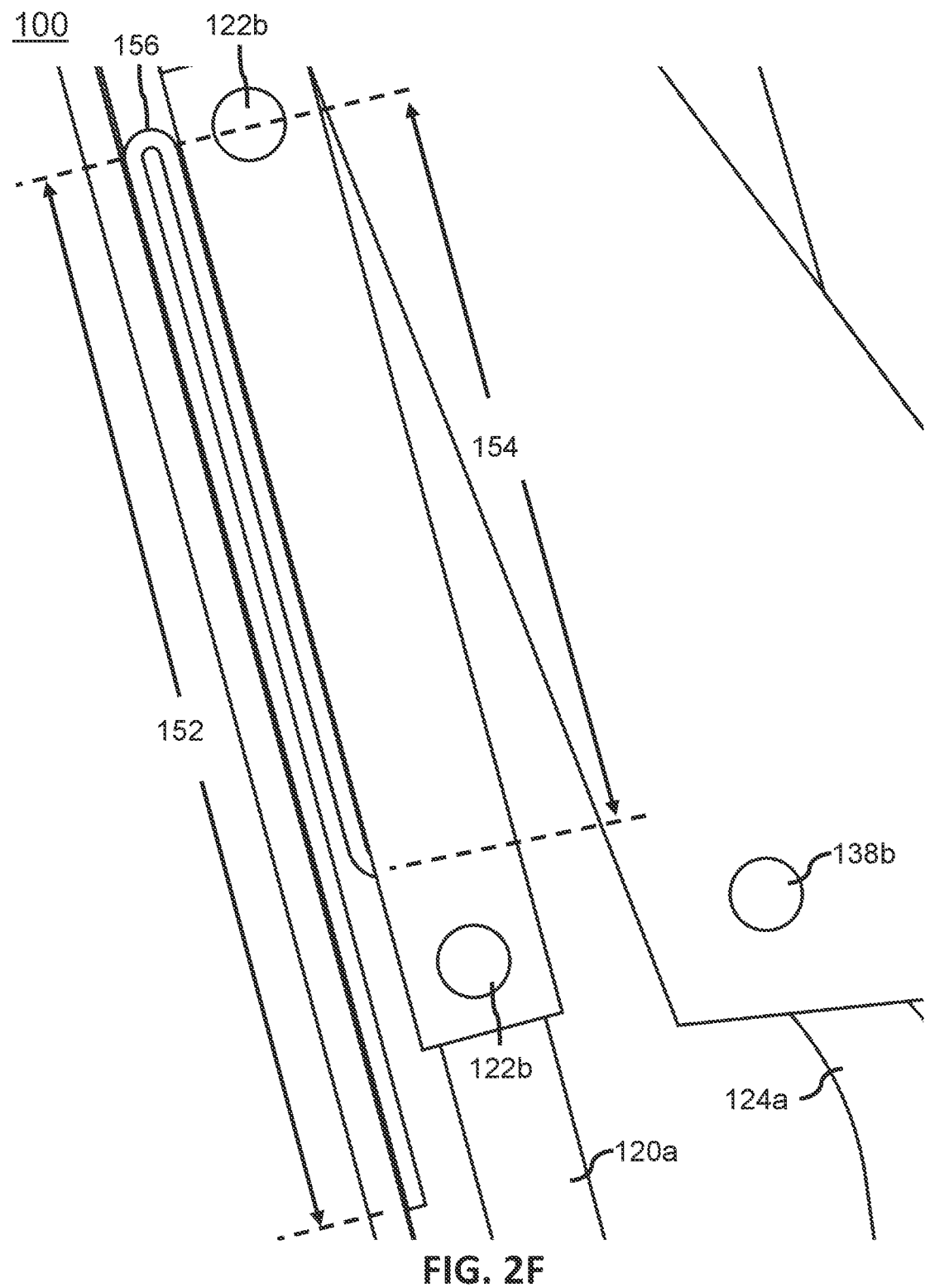
FIG. 2F depicts a partial view of the view of FIG. 2E, in accordance with one or more embodiments of the present disclosure.
Figure 3A:
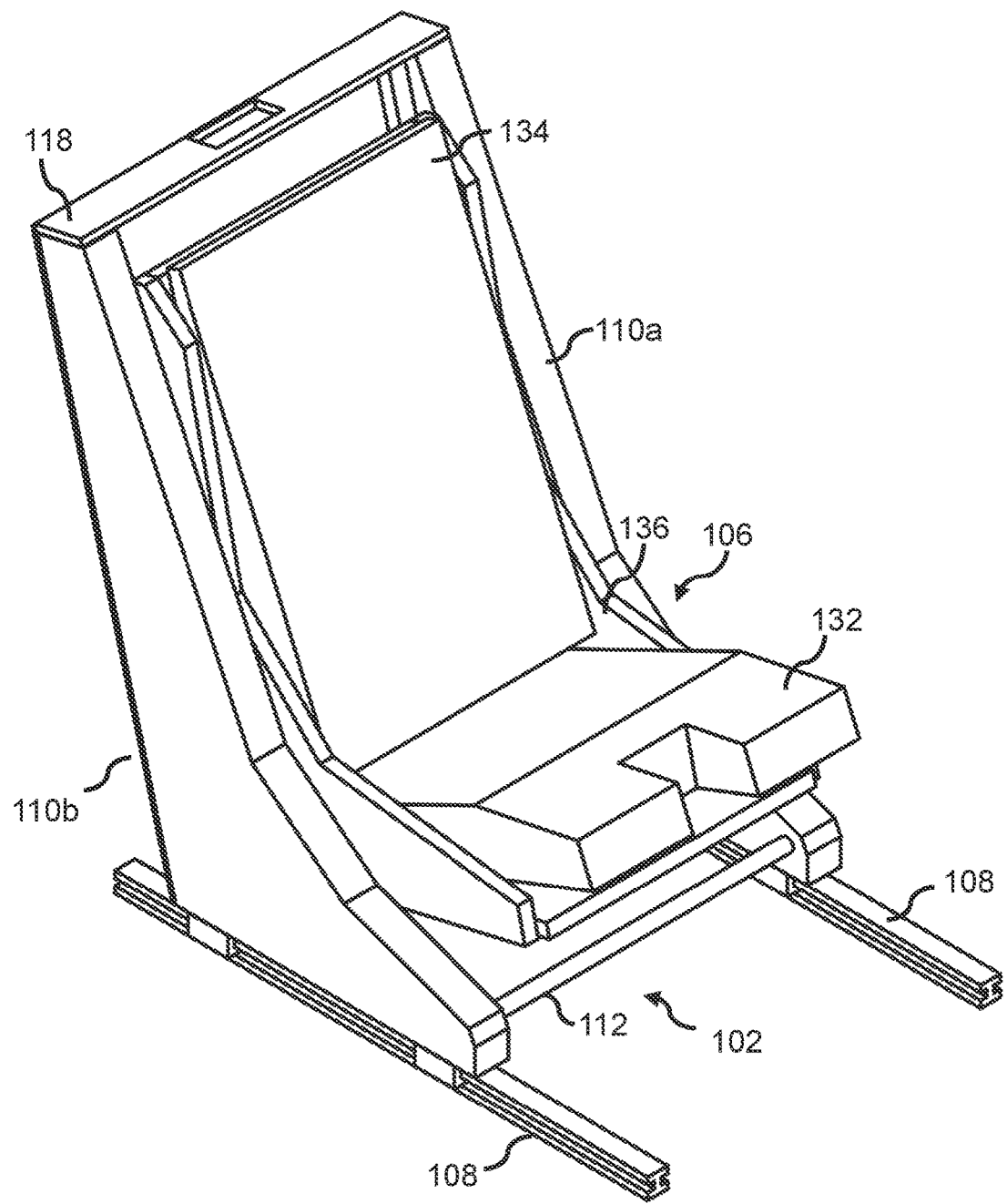
FIG. 3A depicts a front right perspective view of the seating assembly in a crash position, in accordance with one or more embodiments of the present disclosure.
Figure 3B:
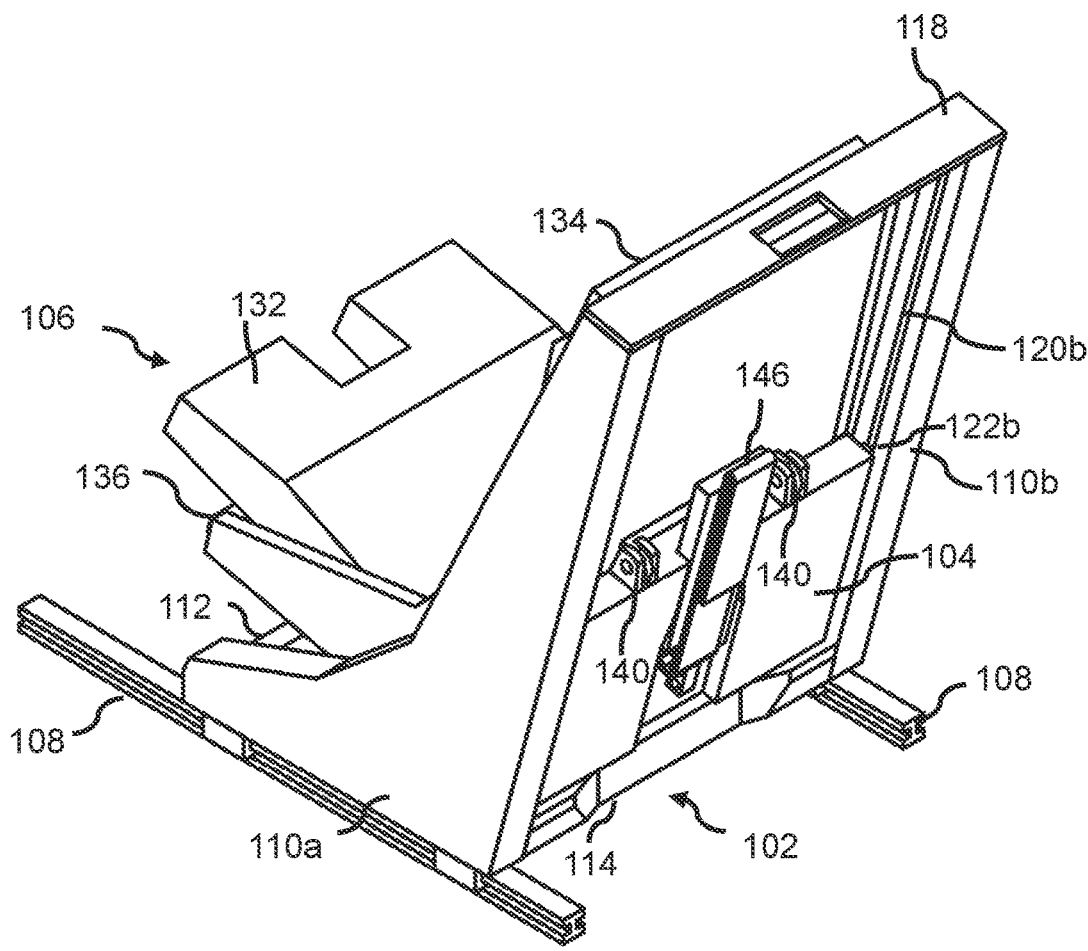
FIG. 3B depicts a rear left perspective view of the seating assembly in the crash with a middle spreader which is hidden to illustrate components of the seating assembly more clearly, in accordance with one or more embodiments of the present disclosure.
Figure 3C:
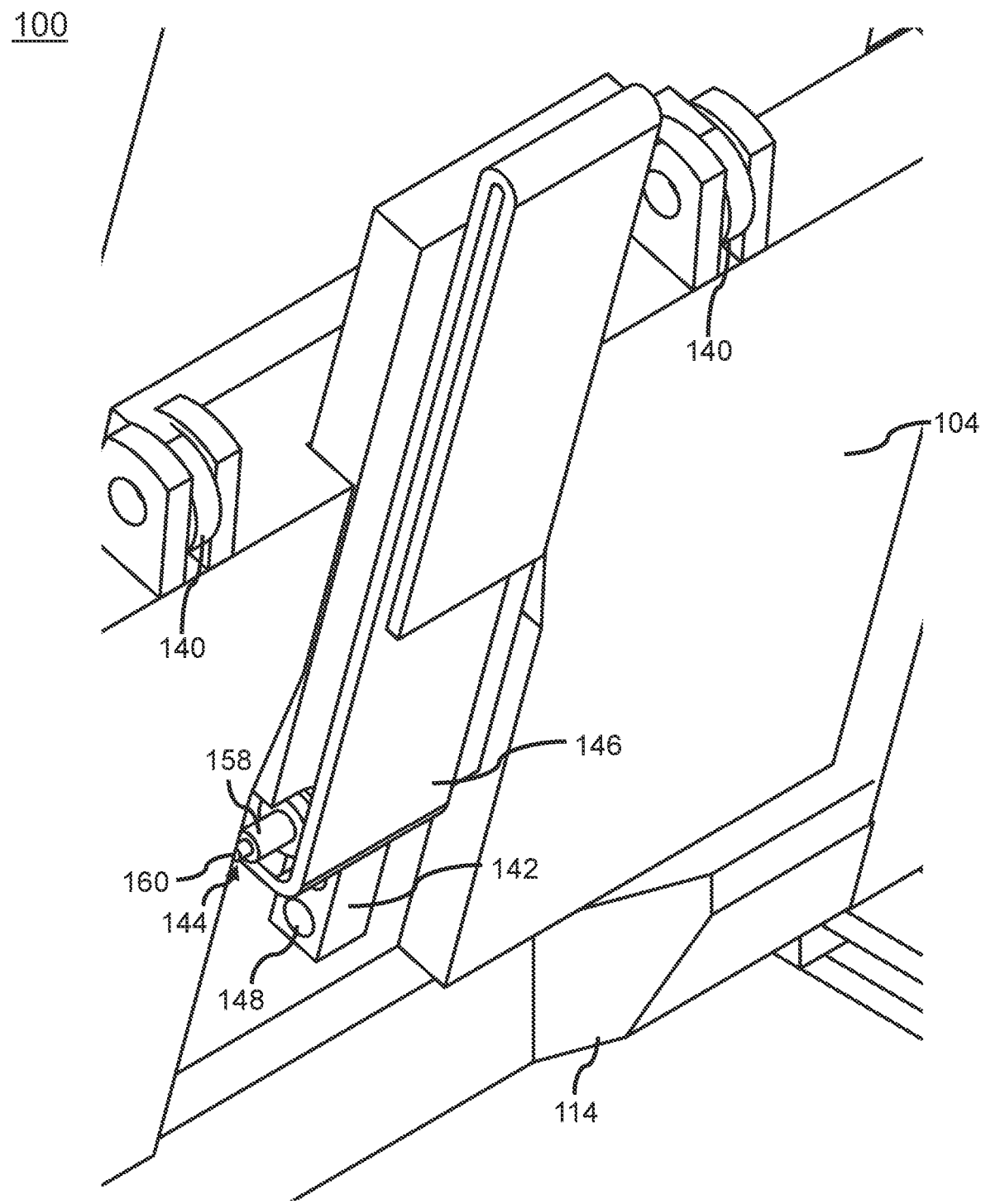
FIG. 3C depicts a partial view of the rear left perspective view of FIG. 3B, in accordance with one or more embodiments of the present disclosure.
Figure 3D:
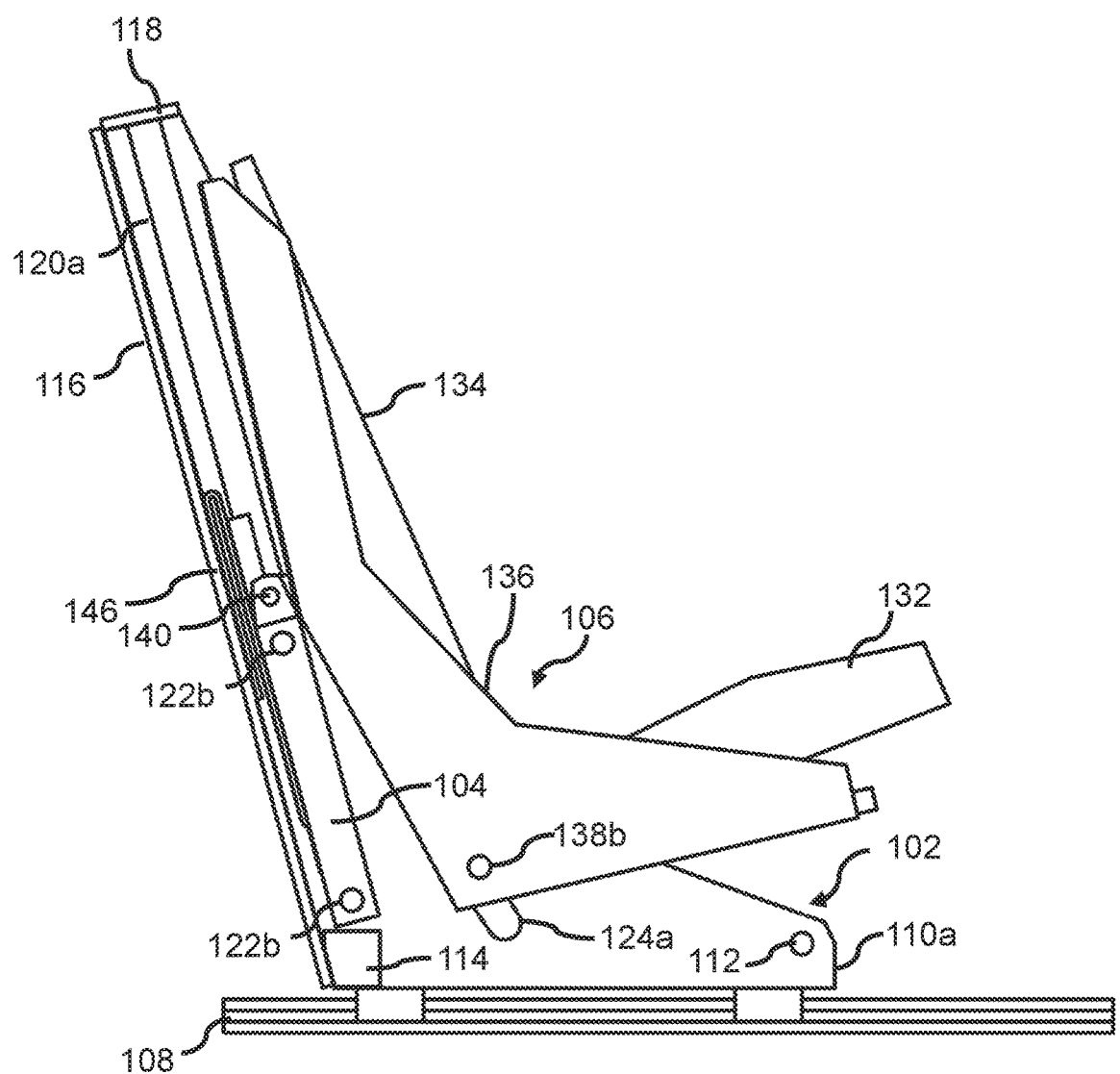
FIG. 3D depicts a right view of the seating assembly in the crash position with a right-side panel which is hidden to illustrate components of the seating assembly more clearly, in accordance with one or more embodiments of the present disclosure.
Figure 3E:
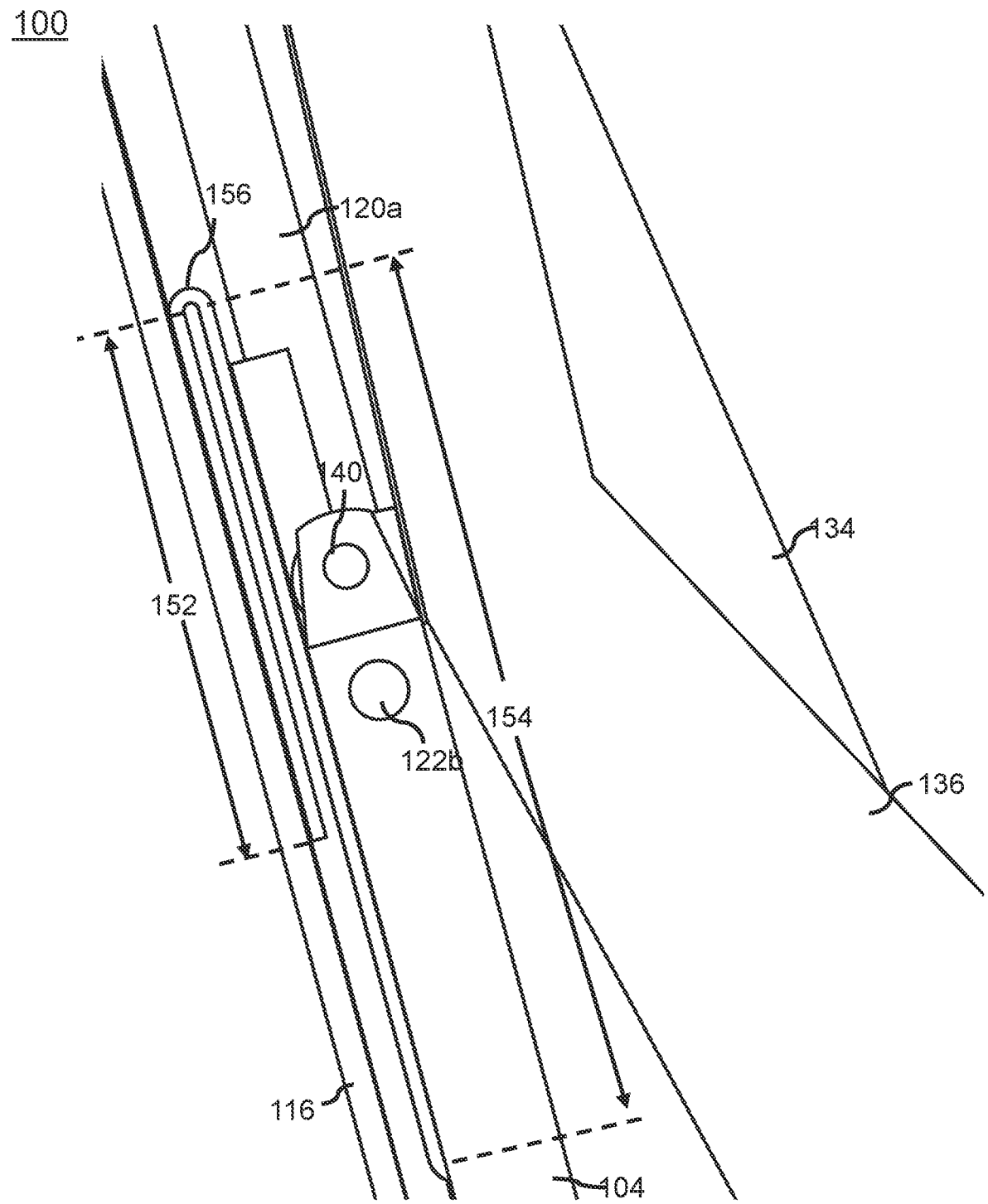
FIG. 3E depicts a partial view of the view of FIG. 3D, in accordance with one or more embodiments of the present disclosure.
Figure 4:
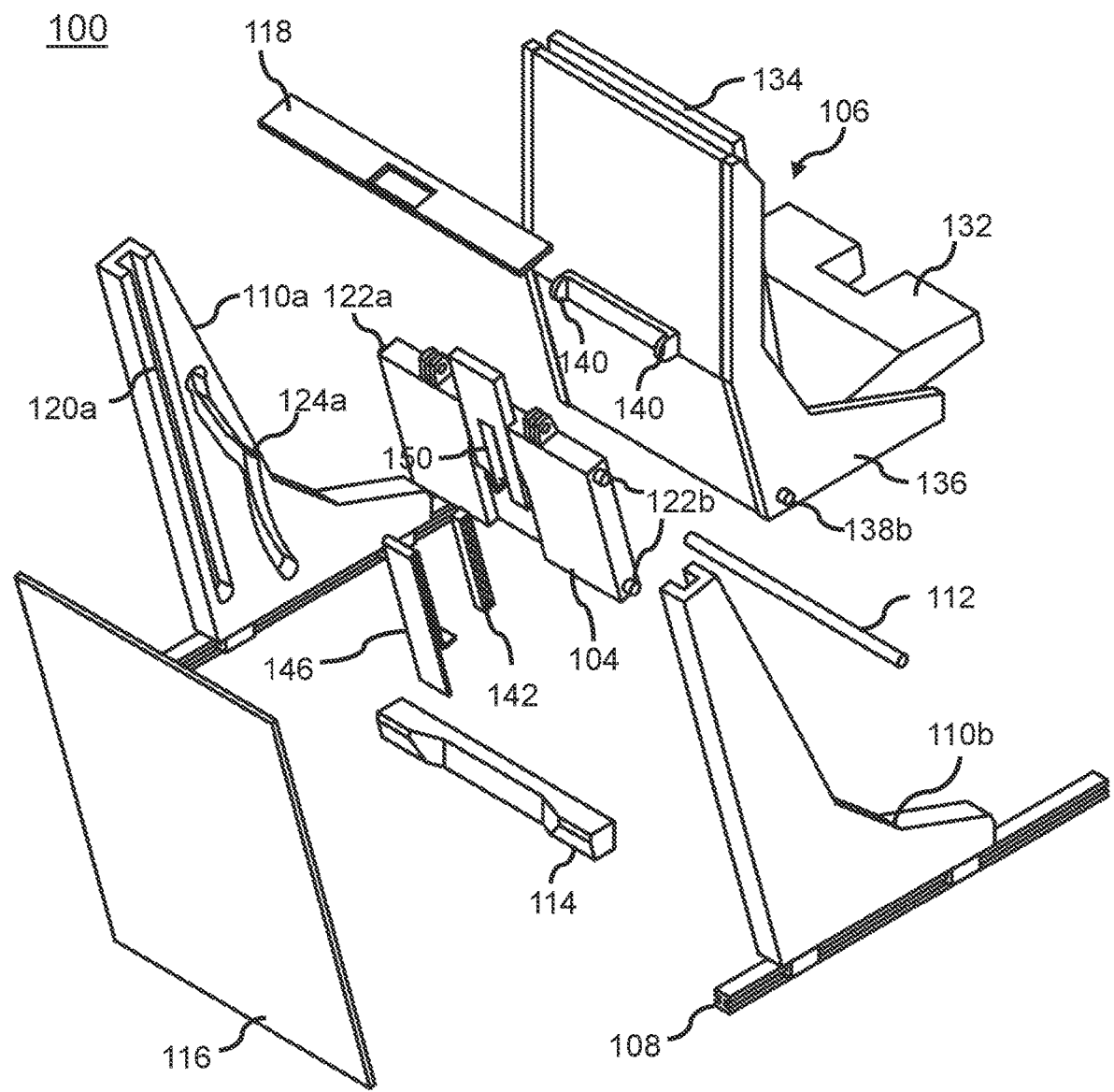
FIG. 4 depicts an exploded view of the seating assembly, in accordance with one or more embodiments of the present disclosure.
Figure 5:
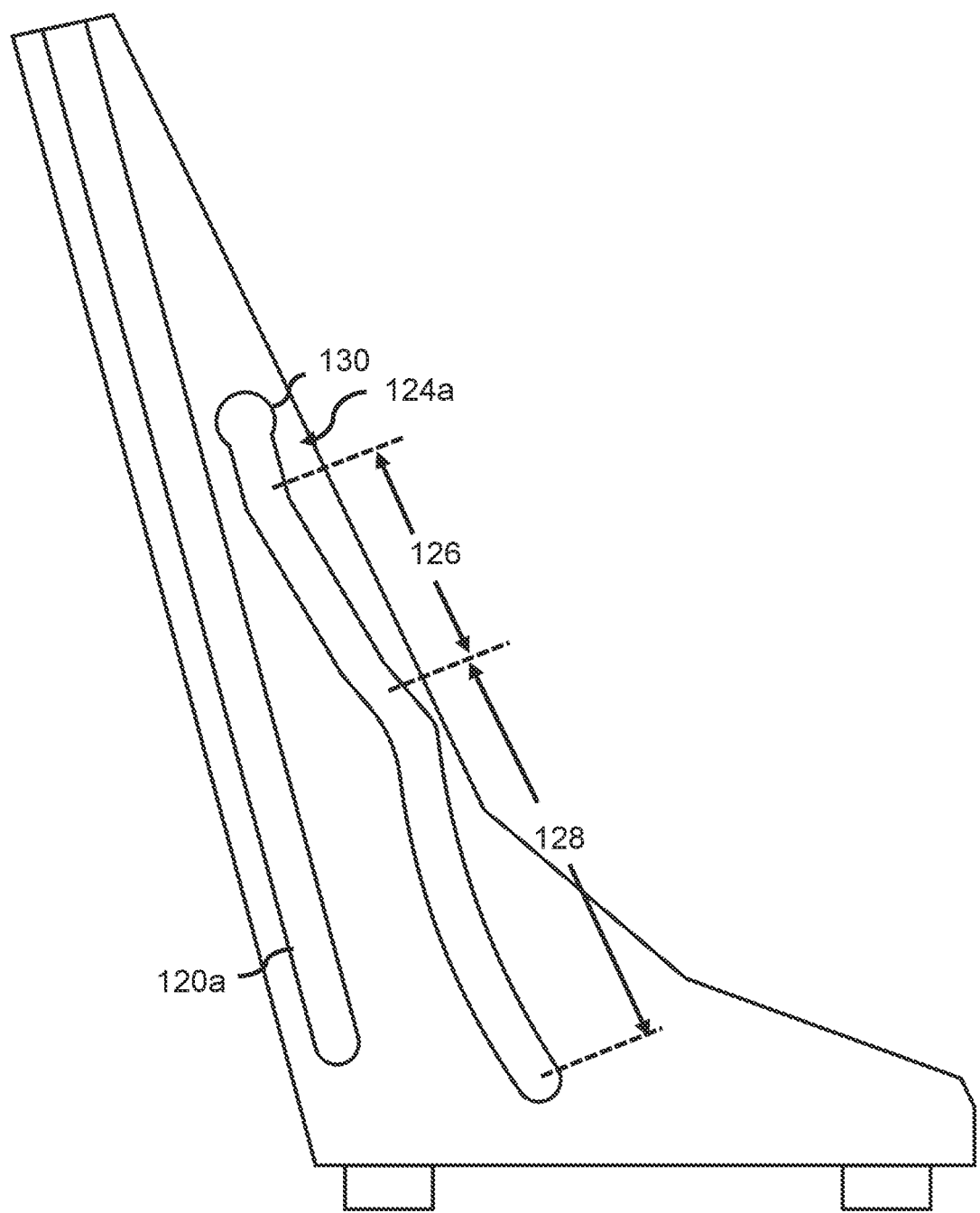
FIG. 5 depicts a right view of a left-side panel, in accordance with one or more embodiments of the present disclosure.

Referring now to FIGS. 1A-5, a seating assembly 100 is described, in accordance with one or more embodiments of the present disclosure. The seating assembly 100 may be a rotorcraft seat, a pilot seat, a crash-attenuating seat, or the like. The seating assembly 100 includes one or more components, such as, but not limited to, base structure 102, carrier 104, seat bucket 106, metering block 142, energy absorbing sheet 146, and the like.

The seating assembly 100 includes base structure 102. The base structure 102 includes one or more components, such as, but not limited to, side panels 110, front spreader 112, lower spreader 114, middle spreader 116, upper spreader 118, and the like.

The base structure 102 includes a pair of the side panels 110. For example, the side panels 110 may include a left-side panel 110a and a right-side panel 110b. The left-side and right-side may be considered left and right, respectively, from a perspective of an operator sitting on the seat bucket 106.

The base structure 102 is configured to couple to floor tracks 108 by the side panels 110. The tracks 108 may be disposed in parallel to each other. Accordingly, the side panels 110 may be aligned with the tracks 108 and extend in parallel to each other. The base structure 102 is configured to translate along the floor tracks 108. The base structure 102 may translate along the floor tracks 108 to set a longitudinal position of the seating assembly 100. For example, the base structure 102 may be adjusted longitudinally forward to accommodate shorter operators sitting on the seat bucket 106 and adjusted longitudinal rearward to accommodate taller operators sitting on the seat bucket 106.

In some embodiments, the side panels 110 may be coupled to the floor tracks 108 by a lock assembly (not shown). The lock assembly may include any suitable components, such as, but not limited to, a pop pin. The lock assembly may be configured to lock and unlock the base structure 102 relative to the floor track 108. For example, the pop pin may be engaged and disengaged to the floor tracks 108, thereby locking and unlocking the base structure 102 relative to the floor track 108. The base structure 102 may translate along the floor track 108 when the lock assembly is unlocked and is prevented from translating along the floor track 108 when the lock assembly is locked. The base structure 102 may be locked in one of several incremental positions along the floor tracks 108.

In some embodiments, the base structure 102 includes the front spreader 112. The front spreader 112 may rigidly couple the side panels 110. For example, the front spreader 112 may span between and couple a front portion of the side panels 110.

In some embodiments, the base structure 102 includes the lower spreader 114. The lower spreader 114 may rigidly couple the side panels 110. For example, the lower spreader 114 may span between and couple a rear-lowermost portion of the side panels 110.

In some embodiments, the base structure 102 includes the middle spreader 116. The middle spreader 116 may rigidly couple the side panels 110. For example, the lower spreader 114 may couple a rear-surface portion of the side panels 110. The middle spreader 116 may be a cover panel. The middle spreader 116 may cover one or more components of the seating assembly 100. For example, the middle spreader 116 may cover the carrier 104, metering block 142, and/or energy absorbing sheet 146.

In some embodiments, the base structure 102 includes the upper spreader 118. The upper spreader 118 may rigidly couple the side panels 110. For example, the upper spreader 118 may span between and couple a rear-topmost portion of the side panels 110.

The side panels 110 each define a channel 120. For example, the left-side panel 110a defines channel 120a and the right-side panel 110b defines channel 120b, collectively the channels 120. The channels 120 may also be referred to as carrier channels. In some embodiments, the channels 120 are rectilinear. In this regard, the channels 120 may be linear guide channels. The channels 120 may be set at a select angle relative to the floor track 108. The select angle of the channels 120 may be parallel with a rear surface of the side panels 110. The channel 120a is aligned with the channel 120b.

The side panels 110 each define a channel 124. For example, the left-side panel 110a defines channel 124a and the right-side panel 110b defines channel 124b, collectively the channels 124. The channels 124 may also be referred to as bucket channels. In some embodiments, the channels 124 are non-linear guide channels. The channel 124 has an incongruent shape relative to the channel 120. The channels 124 may include an angle relative to the floor track 108 which changes based on the position along the side panels 110. A distance between the channels 120 is smallest at a top of the channels 124 and is greatest at a bottom of the channels 124 (e.g., towards the floor track 108). The channel 124a is aligned with the channel 124b.

In some embodiments, the channels 124 include one or more portions. For example, the channels 124 may include an upper portion 126, a lower portion 128, and an inlet portion 130.

The channels 124 include the upper portion 126. The upper portion 126 may be rectilinear or curvilinear. The upper portion 126 is set at an angle relative to the channel 120. The channel 124 is separated from the channel 120 by a select distance. The distance between the upper portion 126 of the channel 124 and the channel 120 increases towards the lower portion 128. For example, the distance between the upper portion 126 and the channel 120 increases from the inlet portion 130 to the lower portion 128. The upper portion 126 is a seat-pan angle adjustment portion of the channel 124.

The channels 124 include the lower portion 128. The lower portion 128 is disposed below and extends from the upper portion 126. The lower portion 128 is curvilinear. The distance between the lower portion 128 and the channel 120 increases away from the upper portion 126. In this regard, the lower portion 128 is curved away from the channel 120. The lower portion 128 is an energy absorption portion of the channel 124. The lower portion 128 provides a stroke in which the energy absorbing sheet 146 is engaged to and deformed by the carrier 104. The precise dimensions of the lower portion 128 (e.g., degree of curvature, length of curvature) may vary according to cockpit/cabin configuration and dimensions.

The channels 124 include the inlet portion 130. The inlet portion 130 is disposed above and extends from the upper portion 126. The inlet portion 130 includes a diameter which is larger than a diameter of the upper portion 126, the lower portion 128, and/or bearings 138 of the seat bucket 106. The inlet portion 130 provides a means for coupling and uncoupling the bearings 138 of the seat bucket 106 to the channel 124.

The channels 120 and the channels 124 may be interior-facing slots defined by the side panels 110. The channels 120 and the channels 124 may be defined in an interior face of the side panels 110. The interior face of the side panels 110 refers to a face of the side panels 110 which face each other. For example, the channel 120a and the channel 120b are defined in a right face of the left-side panel 110a and the channel 120b and the channel 124b are defined in a left face of the right-side panel 110b.

The seating assembly 100 includes carrier 104. The carrier 104 may also be referred to as a carriage. The carrier 104 is disposed between and configured to translate along the side panels 110. The carrier 104 includes bearings 122. The bearings 122 may also be referred to as carrier bearings. The bearings 122 allow for smooth movement within the channels 120. The bearings 122 are disposed at opposing ends of the carrier 104. The bearings 122 are also disposed in and follow the channels 120. For example, the bearings 122 may include left-side bearings 122a which are disposed in and follow the channel 120a and right-side bearings 122b which are disposed in and follow the channel 120b. The bearings 122 and the channel 120 form a prismatic joint between the carrier 104 and the side panels 110. The prismatic joint may also be referred to as a slider, a sliding joint or the like. The prismatic joint constrains the carrier 104 to one degree-of-freedom relative to the side panels 110. The one degree-of-freedom is translation of the carrier 104 along the side panels 110. The carrier 104 is prevented from translating in another axis and from rotating relative to the side panels 110. Thus, the carrier 104 is configured to translate relative to the side panels 110 along the prismatic joint.

In some embodiments, the carrier 104 may include a first pair of the bearings 122 extending from a left-side and a second pair of the bearings 122 extending from a right-side of the carrier 104. It is contemplated that the first and second pair of the bearings 122 may strengthen the seating assembly 100 to withstand high longitudinal loads.

The seating assembly 100 includes seat bucket 106. The seat bucket 106 may also be referred to as a bucket seat, a seat bucket assembly, or the like. The seat bucket 106 includes one or more components, such as, but not limited to, a seat pan 132, a seat back 134, a shell 136, bearings 138, and the like. In some embodiments, the seat bucket 106 may further include one or more harnesses, side armor plates, and the like (not depicted).

The seat bucket 106 includes the seat pan 132 and the seat back 134. The seat pan 132 and the seat back 134 each include a cushion, a dress cover, and the like. The seat pan 132 and the seat back 134 deform to support the operator sitting on the seat bucket 106.

The seat bucket 106 may include the shell 136. The shell 136 supports the seat pan 132 and the seat back 134. In some embodiments, the shell 136 may be made of one or more bullet resistant materials, such as a ceramic composite material, although this is not intended as a limitation of the present disclosure. In some embodiments, the shell 136 may be assembled from a multitude of plates. In some embodiments, the shell 136 is a monolithic shell.

The seat bucket 106 includes bearings 138. The bearings 138 may also be referred to as seat bucket bearings. The bearings 138 are disposed in and follow the channels 124. For example, the bearings 138 may include a left-side bearing 138a which are disposed in and follow the channel 124a and right-side bearing 138b which are disposed in and follow the channel 124b. The bearings 138 allow for smooth movement within the channels 124. The bearings 138 are disposed in and follow the upper portion 126 of the channel 124 during normal operation of the seating assembly 100. The bearings 138 are disposed in and follow the lower portion 128 of the channel 124 when the seating assembly 100 experiences high downwards loads. For example, the seating assembly 100 may experience downwards loads of up to 25G from the floor track 108 during a crash. The downward loads cause the bearings 138 to move from the upper portion 126 of the channel 124 to the lower portion 128. In some embodiments, the bearings 138 are coupled to a rearmost bottom portion of each side of a left-side and a right-side of the shell 136. In some embodiments, the bearings 138 are coupled to the shell 136 via one or more brackets (not depicted).

The seat bucket 106 is coupled to the carrier 104 by a revolute joint 140. The revolute joint 140 may also be referred to as a pivot point, pivot joint, hinge joint, or the like. The revolute joint 140 includes an axis of rotation. The axis of rotation may be in a lateral direction. For example, the axis of rotation may be orthogonal to the tracks 108 (i.e., the tracks 108 define a longitudinal direction and the lateral direction is orthogonal to the longitudinal direction). The revolute joint 140 constrains the motion of the seat bucket 106 to the carrier 104. In particular, the seat bucket 106 is configured to rotate relative to the carrier 104 about the revolute joint 140. The revolute joint 140 prevents translation of seat bucket 106 relative to the carrier 104. The seat bucket 106 translates with the carrier 104. Thus, the seat bucket 106 includes one degree-of-freedom relative to the carrier 104. The revolute joint 140 may be formed of one or more flanges of the carrier 104 and the shell 136 which are pinned. In some embodiments, the seat bucket 106 is coupled to the carrier 104 by a pair of the revolute joints 140. For example, the shell 136 may include a bracket on a rear surface with two flanges which extend outwards and the carrier 104 may include a pair of flanges to receive each of the two flanges of the bracket. In some embodiments, a dimension between the revolute joint 140 and the bearings 122 does not change while the seat bucket 106 moves up and down.

The seat bucket 106 follows the channels 124 as the carrier 104 follows the channels 120. For example, the seat bucket 106 may follow the upper portion 126 of the channels 124. The result of the following the channels 120 and the channels 124 is that seat the bucket 106 is rotated to different angles. The upper portion 126 is shaped relative to the channel 120 to cause rotation of the seat bucket 106 about the revolute joint 140 when the seat bucket 106 follows the upper portion 126. The rotation of the seat bucket 106 about the revolute joint 140 causes rotation of the seat pan 132 and seat back 134. The seat pan 132 may be changed between one or more angles (e.g., an angle relative to the side panels 110). Thus, the seating assembly 100 automatically changes the angle of the seat pan 132 by translating the carrier 104 and bucket 106 relative to the side panels 110.

The carrier 104 and seat bucket 106 may follow the channels 120 and the channels 124 upwards to simultaneously raise a height of the seat pan 132 and decrease the angle of the seat pan 132. The carrier 104 and seat bucket 106 may follow the channels 120 and the channels 124 downwards to simultaneously lower a height of the seat pan 132 and increase the angle of the seat pan 132.

The upper portion 126 may provide a select change in the angle of the seat pan 132. In some embodiments, the angle of the seat pan 132 may change by at least six degrees as the seat bucket 106 follows the upper portion 126. For example, the angle of the seat pan 132 may be at thirteen degrees when the bearings 138 are at an upper end of the upper portion 126 and may be at nineteen degrees when the bearings 138 are at a lower end of the upper portion 126. In some embodiments, the angle of the seat pan 132 may change by at least nine degrees as the seat bucket 106 follows the upper portion 126. For example, the angle of the seat pan 132 may be at thirteen degrees when the bearings 138 are at an upper end of the upper portion 126 and may be at twenty-one degrees when the bearings 138 are at a lower end of the upper portion 126. The specific examples of the starting and ending angle of the seat pan 132 are exemplary and are not intended to be limiting. The starting and ending angle of the seat pan 132 may vary based on a configuration of the seating assembly 100 within a cockpit.

In some embodiments, the seating assembly 100 may include metering block 142. The metering block 142 may also be referred to as a vertical adjustment metering block. The metering block 142 is coupled to the base structure 102. For example, the metering block 142 is coupled to the middle spreader 116. The metering block 142 may be coupled to the middle spreader 116 by the energy absorbing sheet 146. The metering block 142 defines holes 148 arranged in a linear array. The holes 148 of the metering block 142 may be aligned in parallel to the channels 120. The holes 148 may face at least one of the side panels 110.

In some embodiments, the carrier 104 includes a lock assembly 144. The lock assembly 144 is configured to lock and unlock the seat bucket 106 by selectively engaging with the holes 148 of the metering block 142. The lock assembly 144 may be configured to lock and unlock the carrier 104 relative to the base structure 102. Locking and unlocking the carrier 104 relative to the base structure 102 locks and unlocks the seat bucket 106 relative to both the base structure 102 and the carrier 104. The carrier 104 may follow along the channels 120 when the lock assembly 144 is unlocked and is prevented from following along the channels 120 when the lock assembly is locked. Similarly, the seat bucket 106 may follow along the channels 124 when the lock assembly 144 is unlocked and is prevented from following along the channels 124 when the lock assembly is locked. Thus, the lock assembly 144 is configured to retain the seat bucket 106 at a select height and angle.

The seat bucket 106 may be locked in one of several incremental position (e.g., each including a select height and a select angle). The number of incremental positions may be based on the number of holes 148 in the metering block 142 to which the lock assembly 144 may engage. Several incremental positions are contemplated, such as, but not limited to, a full-up position, a neutral position, a full-down position, and the like. The full-up position may correspond to a highest of the holes 148 in the metering block 142 to which the lock assembly 144 engages. The full-down position may correspond to a lowest of the holes 148 in the metering block 142 to which the lock assembly 144 engages. The neutral position may correspond to a hole 148 between the highest and lowest of the holes 148 in the metering block 142 to which the lock assembly 144 engages. The seat bucket 106 may move between the incremental positions during normal vertical adjustment of the seat bucket 106. In some embodiments, the metering block 142 may define eight or more of the incremental positions.

The lock assembly 144 may include any suitable lock assembly, such as, but not limited to, a pop-pin assembly. In some embodiments, the lock assembly 144 includes a pin (not depicted) and an end fitting 158. The end fitting 158 is coupled to a flange of the carrier 104. The pin is configured to translate relative to the end fitting 158. The pin is configured to translate in a lateral direction. For example, the holes 148 of the metering block 142 are configured to receive the pin of the lock assembly 144. The pin may be translated to remove the pin from the holes 148. The lock assembly 144 may be selectively locked and unlocked by a cable 160. The entire length of the cable 160 is not depicted in the interest of clarity. A pin of the lock assembly 144 may be pulled from the holes 148 by the cable 160 when the cable 160 is under tension. The pin then no longer interfaces with the holes 148. The lock assembly 144 is unlocked and the carrier 104 and seat bucket 106 are unlocked and allowed to follow the channels 120 and the channels 124, respectively. The end fitting 158 may include a compression spring (not depicted). The compression spring resides in the end fitting 158 and presses against the pin. When tension is removed from the cable 160, the compression spring extends and causes the pin to translate into the holes 148. The compression spring forces the pin into the holes 148. In this regard, the lock assembly 144 may also be referred to as a pop pin.

The cable 160 may be connected between the lock assembly 144 and a control lever (not depicted) of the seating assembly 100. The control lever may be coupled to the seat bucket 106. The control lever is positioned so that the control lever may be accessed from a seated position. The cable 160 extends from the control lever, underneath the seat bucket 106, to the lock assembly 144. Pulling on the control lever creates tension in the cable 160. The tension in the cable 160 causes the lock assembly 144 to pulls the pin out of the holes 148, thereby unlocking the seat bucket 106. Releasing the control lever removes the tension in the cable 160.

In some embodiments, the seating assembly 100 includes energy absorbing sheet 146. The energy absorbing sheet 146 couples the base structure 102 and the metering block 142. For example, the energy absorbing sheet 146 couples the middle spreader 116 and the metering block 142.

The energy absorbing sheet 146 is in an undeformed state while the seat bucket 106 follows the upper portion 126 of the channel 124. The energy absorbing sheet 146 is undeformed in that the carrier 104 is not actively deforming the energy absorbing sheet 146 with the motion of the carrier 104 and the seat bucket 106. The metering block 142 and the energy absorbing sheet 146 may remain at a fixed position relative to the base structure 102 when the seat bucket 106 follows the upper portion 126 of the channel 124.

The seat bucket 106 may follow the lower portion 128 of the channel 124 to a crash position. When a load is induced great enough to deform the energy absorbing sheet 146, then the carrier 104 and metering block 142 move in unison due to the lock assembly 144 coupling the carrier 104 to the metering block 142. As the seat bucket 106 follows the lower portion 128 of the channel 124 (e.g., during a downward crash in which skids of a helicopter crash into the ground), the carrier 104 causes the energy absorbing sheet 146 to deform. The energy absorbing sheet 146 is engaged to and deformed by the carrier 104 by way of the metering block 142 as the seat bucket 106 follow the lower portion 128 of the channels 124. The energy absorbing sheet 146 strokes due to the coupling between the lock assembly 144 to the metering block 142. The metering block 142 transfers loads from the carrier 104 to the energy absorbing sheet 146. The deformation of the energy absorbing sheet 146 causes the energy absorbing sheet 146 to absorb energy from the seat bucket 106.

The energy absorbing sheet 146 includes one or more portions. For example, the energy absorbing sheet 146 includes a first portion 152, a second portion 154, and a u-shaped portion 156. The first portion 152 is coupled to the middle spreader 116. The second portion 154 is coupled to the metering block 142. The u-shaped portion 156 couples the first portion 152 and the second portion 154. During deformation of the energy absorbing sheet 146, the u-shaped portion 156 is bent to extend the length of the second portion 154 and decrease the length of the first portion 152. Such deformation causes the energy absorption.

The pin of the lock assembly 144 is configured to translate in the lateral direction which is orthogonal to the second portion 154 of the energy absorbing sheet 146. Translating the pin in the lateral direction is advantageous to reduce a longitudinal dimension of the seating assembly 100.

In some embodiments, the carrier 104 defines a recess 150. The recess 150 may receive the metering block 142 as the carrier 104 and the seat bucket 106 follow the channels 120 and the channels 124, respectively. The recess 150 receives but does not engage with the metering block 142 when the seat bucket 106 follows the upper portion 126 of the channels 124. The carrier 104 moves relative to the metering block 142 during normal vertical adjustment of the seat bucket 106. The recess 150 is a clearance slot to allow the carrier 104 to reach the full-down position of the seat bucket 106 during the normal adjustability provided by the lock assembly 144 and the metering block 142.

In some embodiments, the height of the base structure 102 (e.g., the side panels 110 terminating in upper spreader 118) may be sufficiently low as to allow the seat bucket 106 to pivot without interference. For example, as the seat bucket 106 strokes downward and pivots, the shell 136 may tilt rearward toward the middle spreader 116. The height of the base structure 102 may allow the seat bucket 106 to recline relative to the base structure 102 without interfering with the base structure 102 (e.g., without interfering with the upper spreader 118, middle spreader 116, or the like).

In some embodiments, the channels 120 extends through a top surface of the side panels 110. The bearings 122 may be inserted within the channels 120 via the top surface. In some embodiments, the upper spreader 118 is a cap for the channels 120.

The seating assembly 100 may be used for a helicopter or rotorcraft. The seating assembly 100 may be configured to accommodate an operator of the rotorcraft. In some embodiments, the seating assembly 100 will accommodate any operators between the 5th percentile (e.g., height/weight) for female operators and the 95th percentile for male operators. Translating the carrier 104 and seat bucket 106 upwards to simultaneously raise the height of the seat pan 132 and to decrease the angle of the seat pan 132 may be desirably to accommodate smaller occupants. The seat bucket 106 moves up and down to position differently sized pilots correctly to a cockpit design eye line. The angle of the seat bucket 106 may be automatically set for each sized pilot that uses the seating assembly 100. For example, when the seat bucket 106 is in a higher position for the smaller occupant, the angle of the seat pan 132 is reduced to allow for better leg contact to the foot controls. Conversely, when the seat bucket 106 is in a lower position for the larger occupant, the angle of the seat pan 132 is increased to raise the legs for better foot control contact. There are less parts with this design and a high comfort position is obtained with this approach as well.

For example, smaller occupants may require the seat pan 132 at a taller height such that eyes of the smaller occupant are in line with a design eye position within a cockpit of the rotorcraft and may require a smaller angle of the seat pan 132 to enable the feet of the smaller occupant to be in contact with foot controls. If the angle of the seat pan 132 is too high, the thigh of the short operator is too steep causing discomfort in the thigh. Similarly, translating the carrier 104 and seat bucket 106 downwards to simultaneously lower the height of the seat pan 132 and to increase the angle of the seat pan 132 may be desirably to accommodate larger occupants. For example, larger occupants may require the seat pan 132 at a shorter height such that eyes of the larger occupant are in line with the design eye position within the cockpit and may require a larger angle of the seat pan 132 to enable the seat pan 132 to support the thighs of the larger occupant while the larger occupant's feet are in contact with the foot controls. If the angle of the seat pan 132 is too low, the thigh of the taller operator is not supported by the seat pan 132 and causes discomfort in the thigh. Automatically tilting the seat bucket 106 causes the eyes to move towards the eye position and the feet towards the foot controls. Thus, the seat bucket 106 may be adjustable relative to the base structure 102 to accommodate operators of a wide range of height and build in a position where the operator's eye level and/or positioning relative to rotorcraft controls may be optimal.

The seating assembly 100 provides for the ability to have a high comfort position for the operator. This is accomplished by having a lowest most position for the seat bucket 106 that kicks the seat bucket 106 out to an even greater seat pan 132 and backrest 134 angle.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all material advantages. The form described is merely explanatory, and it is the intention of the following claims to encompass and include such changes. Furthermore, it is to be understood that the invention is defined by the appended claims.

What is claimed:

1. A seating assembly comprising:
   a base structure; the base structure comprising a pair of side panels; wherein the pair of side panels each define:
   a carrier channel; and
   a bucket channel; wherein the bucket channel comprises an upper portion, a lower portion, and an inlet portion; wherein a distance between the upper portion and the carrier channel increases from the inlet portion to the lower portion; wherein the lower portion is disposed below and extends from the upper portion; wherein the inlet portion is disposed above and extends from the upper portion;
   a carrier; the carrier comprising one or more carrier bearings; wherein the one or more carrier bearings are disposed in and follow the carrier channel;
   a seat bucket; the seat bucket comprising one or more seat bucket bearings; wherein the one or more seat bucket bearings are disposed in and follow the bucket channel;
   wherein the seat bucket is coupled to the carrier by a revolute joint; wherein the upper portion is shaped relative to the carrier channel to cause rotation of the seat bucket about the revolute joint when the seat bucket follows the upper portion; and
   a metering block and an energy absorbing sheet; wherein the metering block is coupled to the base structure by the energy absorbing sheet; wherein the metering block defines a plurality of holes arranged in a linear array; the carrier comprising a lock assembly; wherein the lock assembly is configured to lock and unlock the seat bucket by selectively engaging with the plurality of holes of the metering block.

2. The seating assembly of claim 1, wherein the upper portion is rectilinear.

3. The seating assembly of claim 1, wherein the upper portion is curvilinear.

4. The seating assembly of claim 1, wherein the lower portion is curvilinear; wherein a distance between the lower portion and the carrier channel increases away from the upper portion.

5. The seating assembly of claim 1, wherein the carrier channel and the bucket channel are interior-facing slots defined by the pair of side panels.

6. The seating assembly of claim 1, wherein the revolute joint comprises an axis of rotation which is in a lateral direction.

7. The seating assembly of claim 1, the seat bucket comprising a seat pan; wherein the rotation of the seat bucket about the revolute joint causes rotation of the seat pan.

8. The seating assembly of claim 7, wherein the carrier and the seat bucket follow the carrier channel and the bucket channel upwards to simultaneously raise a height of the seat pan and decrease an angle of the seat pan; wherein the carrier and the seat bucket follow the carrier channel and the bucket channel downwards to simultaneously lower the height of the seat pan and increase the angle of the seat pan.

9. The seating assembly of claim 8, wherein the angle of the seat pan changes by at least six degrees as the seat bucket follows the upper portion.

10. The seating assembly of claim 9, wherein the angle of the seat pan changes by at least nine degrees as the seat bucket follows the upper portion.

11. The seating assembly of claim 1, wherein the plurality of holes face at least one of the pair of side panels.

12. The seating assembly of claim 1, the base structure comprising a middle spreader; wherein the middle spreader rigidly couples the pair of side panels; wherein the energy absorbing sheet couples the middle spreader and the metering block.

13. The seating assembly of claim 1, wherein the energy absorbing sheet is in an undeformed state while the seat bucket follows the upper portion; wherein the carrier causes the energy absorbing sheet to deform as the seat bucket follows the lower portion.

14. The seating assembly of claim 13, wherein the carrier defines a recess; wherein the recess receives but does not engage with the metering block when the seat bucket follows the upper portion.

\* \* \* \* \*